United States Patent
Mofidi et al.

(10) Patent No.: US 11,051,252 B2
(45) Date of Patent: Jun. 29, 2021

(54) MITIGATING SPECTRAL EMISSION CONDITIONS FOR HIGH TRANSMISSION OUTPUT POWER DURING DEGRADED ANTENNA PEAK GAIN

(71) Applicant: QUALCOMM Incorporated, San Diego, CA (US)

(72) Inventors: Mahbod Mofidi, San Diego, CA (US); Arild Kolsrud, El Cajon, CA (US); Yoshiro Fukuoka, Solana Beach, CA (US); Ara Bicakci, Belmont, CA (US); Michael Kohlmann, San Francisco, CA (US); Steven Jones, Milton Keynes (GB)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/538,533

(22) Filed: Aug. 12, 2019

(65) Prior Publication Data
US 2020/0187127 A1 Jun. 11, 2020

Related U.S. Application Data

(60) Provisional application No. 62/776,891, filed on Dec. 7, 2018.

(51) Int. Cl.
*H04W 52/24* (2009.01)
*H04W 24/08* (2009.01)
*H04W 4/80* (2018.01)

(52) U.S. Cl.
CPC ......... *H04W 52/241* (2013.01); *H04W 24/08* (2013.01); *H04W 4/80* (2018.02)

(58) Field of Classification Search
CPC ..... H04W 52/241; H04W 24/08; H04W 4/80; H04W 52/48; H04W 52/50; H04W 52/367; H04W 52/20; H04B 17/12; H04B 17/18
USPC ....................................................... 455/41.2
See application file for complete search history.

(56) References Cited

U.S. PATENT DOCUMENTS

| 10,123,279 B1 * | 11/2018 | Marupaduga ....... H04W 52/228 |
| 2005/0093624 A1 * | 5/2005 | Forrester ............... H03G 3/001 |
| | | 330/129 |
| 2011/0189964 A1 | 8/2011 | Jeon et al. |

(Continued)

FOREIGN PATENT DOCUMENTS

WO 2015061994 A1 5/2015

OTHER PUBLICATIONS

International Search Report and Written Opinion—PCT/US2019/060321—ISAEPO—dated Mar. 26, 2020.

*Primary Examiner* — Eugene Yun
(74) *Attorney, Agent, or Firm* — Arent Fox, LLP

(57) ABSTRACT

In an aspect of the disclosure, a method, a computer-readable medium, and an apparatus are provided. The apparatus may include a memory and at least one processor coupled to the memory. The at least one processor may be configured to determine a retransmission rate associated with retransmission of one or more packets by the communications device. The at least one processor may be configured to determine a measurement associated with antenna gain of at least one antenna of the apparatus. The at least one processor may be configured to adjust a transmission power of the apparatus based on the retransmission rate and based on the measurement.

27 Claims, 17 Drawing Sheets

(56) References Cited

U.S. PATENT DOCUMENTS

| | | | |
|---|---|---|---|
| 2012/0093114 A1* | 4/2012 | Goto | H04L 5/001 370/329 |
| 2018/0069295 A1 | 3/2018 | Han et al. | |
| 2019/0104485 A1* | 4/2019 | Nguyen | H04W 52/367 |

* cited by examiner

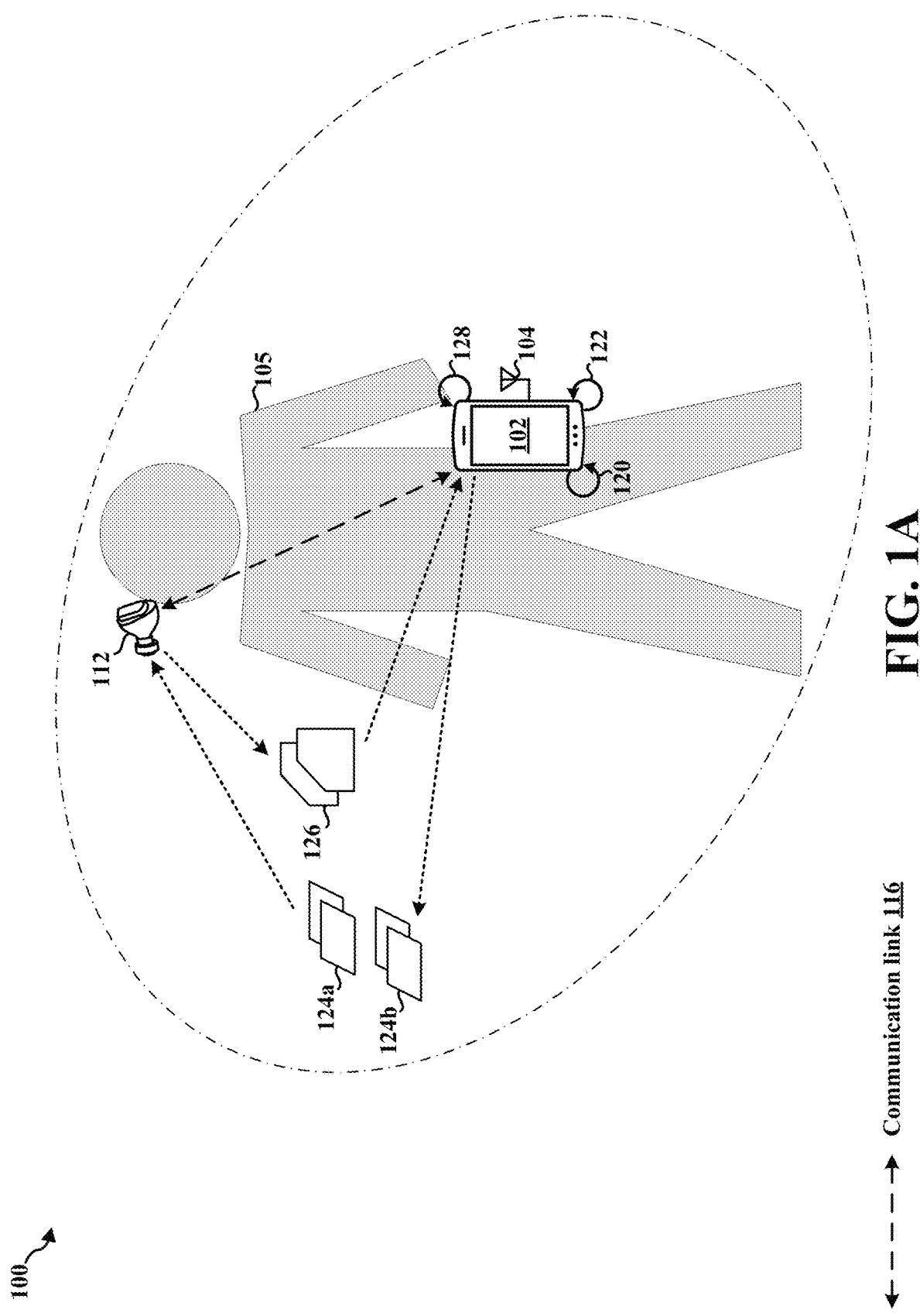

MITIGATING SPECTRAL EMISSION CONDITIONS FOR HIGH TRANSMISSION OUTPUT POWER DURING DEGRADED ANTENNA PEAK GAIN

CROSS REFERENCE TO RELATED APPLICATION(S)

This application claims the benefit of U.S. Provisional Application Ser. No. 62/776,891 entitled "MITIGATING SPECTRAL EMISSION CONDITIONS FOR HIGH TRANSMISSION OUTPUT POWER DURING DEGRADED ANTENNA PEAK GAIN" and filed on Dec. 7, 2018, which is expressly incorporated by reference herein in its entirety.

BACKGROUND

Field

The present disclosure relates generally to communication systems, and more particularly, to adjusting a transmission power of a transmitting device.

Background

A wireless personal area network (WPAN) is a personal, short-range wireless network for interconnecting devices centered around a specific distance from a user. WPANs have gained popularity because of the flexibility and convenience in connectivity that WPANs provide. WPANs, such as those based on short-range wireless communications protocols, provide wireless connectivity to devices by providing wireless links that allow connectivity within a specific distance (e.g., 5 meters, 10 meter, 20 meters, 100 meters, etc.).

Short-range wireless communications protocols may include the Bluetooth® (BT) protocol, the Bluetooth® Low Energy (BLE) protocol, the Zigbee® protocol, and so forth. BT is a wireless technology standard that enables radio frequency communication with ultra-high frequency (UHF) radio waves in the globally accepted Industrial, Scientific & Medical (ISM) band (e.g., from 2.400 gigahertz (GHz) to 2.485 GHz). Similarly, BLE defines a standard that enables radio frequency communication operating within the 2.4 GHz ISM band.

A short-range wireless communications protocol may be used to connect devices over a WPAN. Examples of devices that may communicate over a WPAN may include laptop computers, tablet computers, smart phones, personal data assistants, audio systems (e.g., headsets, headphones, speakers, etc.), wearable devices (e.g., smart watches, fitness trackers), battery-operated sensors and actuators in various medical, industrial, consumer, and fitness applications, and so forth.

In some scenarios, WPANs may offer advantages and conveniences over other network types, such as a wireless local area network (WLAN). However, short-range wireless communications in a WPAN may be susceptible to the same or similar issues as communication in other wireless networks. For example, short-range wireless communications may experience degraded quality when an object, such as a human body, obstructs a path between a transmitter and a receiver. Such issues experienced with short-range wireless communications may degrade the performance of devices, may degrade a user experience, and so forth. Thus, a need exists for an approach to addressing an occluded communications path in short-range wireless communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Various standards and protocols for use with a wireless personal area network (WPAN), such as the Bluetooth® (BT) and/or Bluetooth® Low Energy (BLE), define how devices may operate. For example, BT and BLE standards and protocols may define a frequency spectrum in which devices are to communicate and maximum transmission powers at which devices may transmit in order to reduce interference to other devices operating in the spectrum or a proximate spectrum.

A receiving device, such as a BT wireless headset, may receive packets from a transmitting device, such as a smart phone or personal media player. When the transmitting device is proximate to an absorptive body, such as when the transmitting device is placed in the user's pocket, the radio frequency (RF) link margin may be degraded to due various issues. For example, RF energy may be absorbed by human body tissue when transmitted, which may be particularly problematic because the spectrum in which BT operates, including 2400 megahertz (MHz) to 2483.5 MHz, and channelized from 2402 MHz to 2480 MHz, is highly absorptive by human body tissue. In addition, the human body may shield RF energy, such as when a communications link is across the body of a user. Further, the antenna radiation pattern from the transmitting device may degrade, resulting in a reduction of peak antenna gain in comparison to free or open space. Finally, antenna matching of a device may experience detuning, which may result in an antenna mismatch and a relatively higher voltage standing wave ratio (VSWR).

One or more of the aforementioned issues, as well as other potential issues, may compound and/or collectively reduce the signal strength at the receiving device. In addition to occlusion of the transmitting device, the receiving device may be similarly obstructed, such as when a headset is obstructed by the user's head and/or ear, further reducing the signal strength acquired by the receiving device. Consequently, a stream of packets may become degraded. For example, audio over an Advanced Audio Distribution Profile (A2DP) link may sound "choppy" to the user, for example, when the transmitting device is placed in the user's pocket. One or more issues arising from occlusion of the transmitting and/or receiving devices by the user's body may be collectively known as the "cross-the-body" issue. An example of the "cross-the-body" issue may be when a smartphone is in a user's pocket while the connected headset is in a user's ear may cause A2DP audio quality degradation. The present disclosure may present various techniques and approaches for mitigating the reduction in signal strength and/or quality that may be commensurate with the relative close proximity of a transmitting device and/or receiving device to a user's body.

In an aspect of the disclosure, a method, a computer-readable medium, and an apparatus are provided. The apparatus may include a memory and at least one processor coupled to the memory. The at least one processor may be configured to determine a retransmission rate associated with retransmission of one or more packets by the communications device. The at least one processor may be configured to determine a measurement associated with antenna gain of at least one antenna of the apparatus. The at least one processor may be configured to adjust a transmission power of the apparatus based on the retransmission rate and based on the measurement.

In one aspect, the measurement associated with the antenna gain may be at least one of a VSWR measurement or a decibel (dB) measurement indicating reflected RF power. In one aspect, the retransmission rate may be determined based on a number of the one or more packets retransmitted by the apparatus or based on a number of received requests for the retransmission of the one or more packets.

In one aspect, the at least one processor may be configured to adjust the transmission power by increasing the transmission power of the apparatus when the retransmission rate satisfies a first threshold and when the measurement satisfies a second threshold, and the increased transmission power may exceed a threshold transmission power configured for the apparatus based on an adjacent channel power (ACP) standard. Similarly, the at least one processor may be configured to adjust the transmission power by decreasing the transmission power of the apparatus when the retransmission rate fails to satisfy a first threshold and/or when the measurement fails to satisfy a second threshold, and the decreased transmission power may be decreased from an increased transmission power that exceeds a threshold transmission power configured for the apparatus based on an ACP standard.

In one aspect, the apparatus may include a power detection circuit that is configured to detect the measurement. The at least one processor may be configured to determine the measurement based on activation of the power detection circuit for the detection of the measurement. Further, the at least one processor may be configured to adjust the transmission power based on a correspondence between the detected measurement and the adjusted transmission power.

In one aspect, the apparatus may include a receiver circuit configured to detect a reflected signal via the at least one antenna of the apparatus. The at least one processor may be configured to determine the measurement based on the reflected signal. Further, the at least one processor may be configured to adjust the transmission power based on at least one of a differential error vector magnitude (DEVM) or an ACP associated with the reflected signal.

In one aspect, the apparatus may include a comparator circuit configured to detect the measurement, and configured to deactivate an attenuator when the detected measurement satisfies a first threshold. When the retransmission rate satisfies the first threshold, the at least one processor may be configured to determine the measurement and adjust the transmission power based on activation of the comparator circuit for the detection of the measurement and the deactivation of the attenuator.

In one aspect, the apparatus may include a comparator circuit configured to detect the measurement, and configured to increase a gain of an external power amplifier connected with the at least one antenna when the detected measurement satisfies a first threshold. When the retransmission rate satisfies a second threshold, the at least one processor may be configured to determine the measurement and adjust the transmission power based on activation of the comparator circuit for the detection of the measurement and the increase of the gain of the external power amplifier.

In one aspect, the apparatus may further include at least one other antenna associated with a receive chain that is different from a transmit chain associated with the at least one antenna. The at least one processor may be configured to determine the measurement based on a reflected signal detected via the at least one other antenna.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 1A is a diagram illustrating an example of a WPAN, in accordance with certain aspects of the disclosure.

DETAILED DESCRIPTION

Figure 1B:
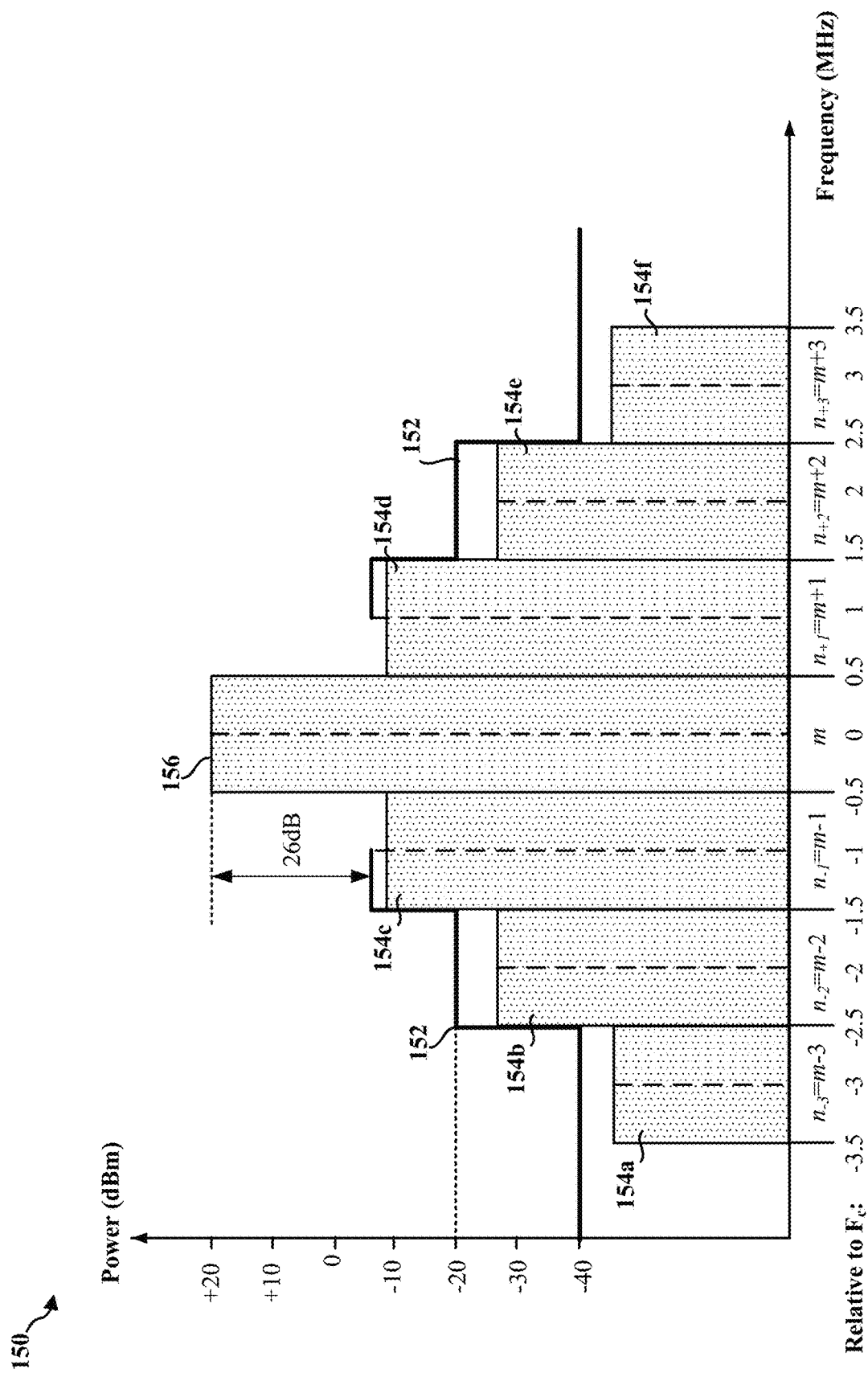
FIG. 1B is a graph illustrating a spectral mask, in accordance with certain aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example configurations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1A illustrates an example wireless personal area network (WPAN) 100, in accordance with certain aspects of the disclosure. Within the WPAN 100, a source device 102 (e.g., a wireless transmitting device) may use a communications link 116 to communicate with a sink device 112 (e.g., a wireless receiving device) using a short-range wireless communications protocol. Illustratively, the short-range wireless communications protocol may include a Bluetooth® (BT) protocol or a BT Low Energy (BLE) protocol.

While the present disclosure may describe various aspects in the context of a WPAN implemented through BT and/or BLE, the present disclosure is not limited to a WPAN, BT, and/or BLE. Various aspects described herein may be applicable to a number of different technologies. For example, the concepts of the present disclosure may be applicable to any short-range radio/wireless technologies, such as Wi-Fi Direct, Infrared Wireless (IrDA), Ultra Wideband (UMB), induction wireless, ZigBee, and so forth. In addition, aspects of the present disclosure may be applied in a wireless local area network (WLAN), such as with WLAN voice over Internet Protocol (IP) (VoIP). In another example, aspects of the present disclosure may be applied in cellular networks, such as with a Long Term Evolution (LTE) radio access technology (RAT) and/or Fifth Generation (5G) New Radio (NR) RAT.

Examples of the source device 102 include a cellular phone, a smart phone, a session initiation protocol (SIP) phone, a mobile station (STA), a laptop, a personal computer (PC), a desktop computer, a personal digital assistant (PDA), a satellite radio, a global positioning system, a multimedia device, a video device, a digital audio player (e.g., MP3 player), a camera, a game console, a tablet, a smart device, a wearable device (e.g., smart watch), a vehicle, an electric meter, a gas pump, a toaster, a thermostat, a hearing aid, a wireless headset (including wireless headphones), a medical sensor, a blood glucose on-body unit, an Internet-of-Things (IoT) device, or any other similarly functioning device.

Examples of the sink device 112 include a cellular phone, a smart phone, a SIP phone, a STA, a laptop, a PC, a desktop computer, a PDA, a satellite radio, a global positioning system, a multimedia device, a video device, a digital audio player (e.g., MP3 player), a camera, a game console, a tablet, a smart device, a wearable device (e.g., a smart watch), a vehicle, an electric meter, a gas pump, a toaster, a thermostat, a hearing aid, a wireless headset (including wireless headphones), a medical sensor, a blood glucose on-body unit, an IoT device, or any other similarly functioning device. Although the source device 102 is illustrated in communication with one sink device 112 in the WPAN 100, the source device 102 may communicate with more peripheral devices within the WPAN 100 without departing from the scope of the present disclosure.

According to various configurations, a device may operate according to one or more radio modes. For example, the source device 102 may be configured to implement the BT protocol, and so may operate according to one radio mode, such as basic rate (BR)/enhanced data rate (EDR). In another example, the source device 102 may be configured to implement the BLE protocol, and so may operation according to a BLE radio mode. In some aspects, a device (e.g., the source device 102) may be configured with dual radio modes, and therefore may be able to operate according to the BR/EDR mode and the BLE mode. For example, a device may operate according to either the BR/EDR mode or the BLE mode at different times based on the type of short-rage wireless communication in which the device may engage.

Illustratively, the device may operate according to the BR/EDR mode for continuous streaming of data (e.g., audio data), for broadcast networks, for mesh networks, and/or for some other applications in which a relatively higher data rate may be more suitable. However, the device may operate according to the BLE mode for short burst data transmissions and/or for some other applications in which power conservation may be desirable (e.g., and a relatively lower data rate may be acceptable). In other aspects, a device may operate according to one or more other radio modes, including proprietary radio mode (e.g., high speed radio modes, low energy radio modes, isochronous radio modes, etc.).

A short-range wireless communications protocol (e.g., BT and/or BLE) may include and/or may use one or more other communications protocols, such as when establishing and maintaining communications links. As illustrated, the source device 102 may establish a communications link 116 with the sink device 112, according to at least one communications protocol for short-range wireless communications.

The communications link 116 may include a link that adheres to a protocol included and/or for use with BT or BLE. In one aspect, the communications link 116 may include an asynchronous connection-less (ACL) link. With ACL, the source device 102 may connect (or "pair" in the terminology of the BT specification) with a second device (e.g., the sink device 112). The connection is asynchronous in that the two devices may not need to synchronize, time-wise, data communications between each other to permit communication of data packets via the communications link 116.

In one aspect, the communications link 116 may include an Advanced Audio Distribution Profile (A2DP) link. An A2DP link provide for a point-to-point link between a source device (e.g., the source device 102) and a sink device (e.g., the sink device 112). With an A2DP link, data packets including audio may be transmitted over an ACL data channel, and other information (e.g., for controlling the audio stream) may be transmitted over a separate control channel. The data packets (e.g., including audio) may occur non-periodically.

A2DP may be supported by EDR—e.g., BT A2DP may be supported by BT EDR. EDR may include two modulation schemes. One modulation scheme may be π/4 dual-polarization quadrature phase shift keying (DPQPSK), which may involve the polarization multiplexing of two different QPSK signals in order to improve spectral efficiency. The π/4 DPQPSK modulation scheme may be used for a bandwidth of approximately 2 megabits per second (Mbps). Another modulation scheme may be 8 differential phase-shift keying (DPSK). The 8DPSK modulation scheme may be used for a bandwidth of approximately 3 Mbps.

In other aspects, the communications link 116 may support one or more other synchronous logical transport mechanisms between the source device 102 and the sink device 112. For example, the communications link 116 may include a synchronous connection oriented (SCO) link, an extended SCO (eSCO) link, or an isochronous (ISO) link.

The source device 102 may transmit packets that may be received by sink device 112 over the communications link 116. For example, the source device 102 may stream audio to the sink device 112 that is output by one or more speakers of the sink device 112 (e.g., each packet may include a payload that carries audio data which the sink device 112 is configured to output). When the source device 102 is occluded by a body 105 of a user (e.g., when the source device 102 is placed in the user's pocket), the radio frequency (RF) link margin may be degraded due to various issues. For example, RF energy may be absorbed by body 105 (e.g., by tissue of the body 105) when transmitted, which may be particularly problematic because the spectrum in which the communications link 116 may operate may be absorbed by human body tissue. For example, the communications link 116 may include a link that operates in a spectrum from 2400 megahertz (MHz) to 2483.5 MHz, and channelized from 2402 MHz to 2480 MHz, and the user's body 105 may be highly absorptive of RF energy in that spectrum.

In addition, the body 105 may shield RF energy, such as when a communications link is across the body 105 of the user (e.g., the sink device 112 is in the user's right ear while the source device 102 is in the user's left pocket, or vice versa). Further, the radiation pattern of the at least one antenna 104 from the source device 102 may degrade, resulting in a reduction of peak antenna gain (e.g., in comparison to free or open space). Antenna matching of the source device 102 (including the at least one antenna 104 and another of the at least one antenna) may also experience detuning, which may result in an antenna mismatch and a relatively higher voltage standing wave ratio (VSWR).

One or more of the aforementioned issues, as well as other potential issues, may compound and/or collectively reduce the signal strength at the sink device 112. In addition to occlusion of the source device 102 (e.g., by the body 105), the sink device 112 may be similarly obstructed (e.g., as a headset, the sink device 112 may be obstructed by the head of the user's body 105), further reducing the signal strength acquired by the sink device 112. Consequently, a stream of packets (e.g., an audio stream) over the communications link 116 may become degraded.

For example, audio over an A2DP communications link 116 may sound "choppy" to the user (e.g., when the source device 102 is placed in the user's pocket and the communications link 116 is obstructed by the user's body 105). One or more issues arising from occlusion/obstruction of the source device 102 and/or the sink device 112 by the user's body 105 may be collectively known as the "cross-the-body" issue—e.g., the "cross-the-body" issue when the source device 102 is in the user's pocket while the sink device 112 is in the user's ear may cause audio quality degradation. The present disclosure may present various techniques and approaches for mitigating the reduction in signal strength and/or quality that may be commensurate with the relative close proximity of the source device 102 and/or the sink device 112 to the user's body 105, which may be highly absorptive of transmissions by the source device 102.

Since the source device 102 may be the source of data packets (e.g., A2DP packets) that are transmitted over the communications link 116 to the sink device 112, one approach to addressing the reduction of RF power of transmissions on the communications link 116 due to relatively close proximity to an absorptive object (e.g., a human body) is to increase the transmission power of the source device 102 to overcome the loss and/or reflection of signals by the body 105.

However, as a transmission power is increased, an in-band mask may be violated. An in-band mask may define one or more lines applied to one or more levels of RF transmissions in order to reduce adjacent channel interference by constraining excessive energy outside the in-band spectrum (e.g., 2.400 to 2.485 GHz for BT, 2.4 GHz for Wi-Fi, 5 GHz for Wi-Fi, etc.). In the context of BT, the BT Core Specification may define an in-band mask, such as for EDR transmissions.

An in-band mask may include an Adjacent Channel Power (ACP) parameter. Illustratively, an ACP parameter for BT may be defined by the BT Special Interest Group (SIG) specifications. The ACP power level measurement may be defined as effective isotropic radiated power (EIRP) and, therefore, the antenna performance of a device may be considered because the complete RF system of the device (that is, the radio and the antenna) determines the total radiated power, and thus spurious emissions, of the device.

In connection with the contribution of the device radio and antenna, one or more factors may contribute to the spurious emissions of a device. For example, spectral regrowth may be caused by nonlinearities in the gain stages of a device's RF signal chain, and the spectral regrowth may cause a device to violate an ACP parameter (e.g., BT ACP parameter). ACP parameter violations may be caused by intermodulation distortion (IMD), which reflects a measure of the linearity of an RF component (e.g., a gain block, an amplifier, etc.). ACP parameter failures may be caused by third-order IMD (IMD3) amplitudes that increase 3 dB for every 1-dB of signal increase (i.e., IMD3 has a slope of 3:1). Similarly, alternate channel power parameter failures may be caused by fifth-order IMD (IMD5) amplitudes that increase 5 dB for every 1-dB of signal increase (i.e., IMD5 has a slope of 5:1). Other examples of factors that may contribute to spurious device emissions may include transmitter baseband modulator noise, transmitter digital-to-analog converter (DAC) quantization noise, phase-locked loop (PLL) phase noise and/or spurs, thermal noise, and/or supply noise.

An ACP parameter may be particularly demanding for device compliance because ACP testing (e.g., at the device manufacturer) may use measurements that are based on test equipment in which the max hold of a trace is captured. By way of example, ACP testing for BT devices may increase an energy level by approximately 8.5 to 10 dB above an average or root mean square (rms) measurement and, therefore, adherence to the BT ACP parameter may be difficult.

With reference to FIG. 1B, a graph 150 illustrates a spectral mask 152. The spectral mask 152 may be defined for one or more short-range wireless communications technologies—e.g., the spectral mask 152 may be defined by BT SIG for 2 Mbps EDR (EDR2) and 3 Mbps EDR (EDR3) signal standards. In some aspects, one or more ACP parameters may include the spectral mask 152. The present disclosure may describe spurious emissions, spectral masks, and the like in the context of BT and/or BLE; however, the present disclosure is not limited to BT and/or BLE. For example, other standards and/or protocols may define one or more spectral masks, and other devices operating according to such standards and/or protocols may cause spurious emissions, such as when experiencing a reduction of RF power due to relatively close proximity to an absorptive object (e.g., human body) when increasing a transmission power.

The source device 102 may be configured to transmit a signal (e.g., a data packet, which may include audio data in a payload). The signal may be transmitted on a center frequency $F_c$, which may include a channel m, and therefore channel m may correspond to an offset of 0 MHz (i.e., because channel m is the intended channel on which the signal is to be carried).

In some aspects, the source device 102 may be configured to transmit the signal on channel m with a transmission power 156 that corresponds to +20 dB-milliwatts (dBm). For example, the source device 102 may transmit the signal with the transmission power 156 equal to approximately +20 dBm when the source device 102 detects the absorption and reduction of RF power, as described herein.

The transmission power 156 of approximately +20 dBm may cause the signal to leak into other channels that are both positively and negatively offset from $F_c$. As shown, the offset channels n may include channels $n_{-1}$ (including m−1 MHz), $n_{-2}$ (including m−2 MHz), and $n_{-3}$ (including m−3 MHz), which are negatively offset from $F_c$. Further, the offset channels n may include channels $n_{+1}$ (including m+1 MHz), $n_{+2}$ (including m+2 MHz), and $n_{+3}$ (including m+3 MHz), which are positively offset from $F_c$.

The ACP parameters, including the spectral mask 152, show that when the source device 102 transmits the signal on channel m, at $F_c$, the signal emissions on the offset channels n should not exceed a threshold amount. For example, when the source device 102 transmits the signal on channel m, the power of the signal should not exceed −40 dBm on channel $n_{-3}$ and channel $n_{+3}$. In other words, the power 154a of the signal in the band −2.5 MHz to −3.5 MHz and the power 154f of the signal in the band +2.5 MHz to +3.5 MHz should not exceed −40 dBm.

For some devices, when the transmission power of the device is increased to offset the reduction of RF power, the increased transmission power may violate the ACP parameters (e.g., depending upon the design of the device's transmit chain). In particular, some existing and/or legacy devices may not be designed to achieve a higher output power while also maintaining spectral purity; in other words, spurious emissions may commensurately increase with a transmission power suitably increased to overcome the reduction of RF power. While the BT Core Specification allows for up to 3 ACP parameter exceptions per channel, increasing the transmission power may cause some devices to fail the ACP parameter more frequently and/or on more channels (e.g., especially legacy devices).

In general, the ACP parameter marginalities and failures frequently occur at +/−2 MHz, +/−3 MHz, and so forth, as the transmission power is increased to approximately +10 dBm to +15 dBm output power measured at the antenna port of the device. However, increased transmission powers approaching +20 dBm may be needed to overcome the reduction of RF power. Therefore, devices are more likely to violate the ACP parameter, and those violations are likely to both be more severe and occur at multitudes of frequency offsets beyond the limits of the BT SIG frequency offset exceptions.

In some aspects, the ACP parameters at +/−2 MHz, +/−3 MHz, and farther frequency offsets (e.g., as set in the BT Core Specification) may be defined as absolute integrated power specifications, rather than relative to a main transmission energy lobe. Thus, as the output power of a device is increased, the absolute level of one or more factors contributing to spurious emissions (e.g., IMD, transmitter baseband modulator noise, transmitter DAC quantization noise, PLL phase noise and/or spurs, thermal noise, supply noise, etc.) may likewise increase. Additionally, spectral regrowth may grow even further due to nonlinearities of the transmit chain blocks (e.g., a pre-power amplifier, a power amplifier, and/or an external power amplifier), if such blocks are present.

Therefore, due to the BT ACP parameter marginalities and failures, BT devices are often limited to an output power of +10 dBm to +15 dBm at the antenna port, which may be insufficient to deliver the estimated increased transmission powers approaching +20 dBm needed to overcome the reduction of RF power. Even devices capable of delivering the +20 dBm output power may have this capability disabled. For example, the capability to deliver +20 dBm output power may be disabled due to the overhead incurred on power consumption (a relatively highly linear transmit chain design able to perform at the +20 dBm output power while also adhering to BT ACP parameters may be relatively expensive in terms of power consumption).

In some aspects, the source device 102 may be configured to avoid violating the ACP parameters, such as the spectral mask 152, even when transmitting with an output power that is sufficient to overcome the reduction of RF power (e.g., +20 dBm). For such a configuration, the spurious emissions of the source device 102 may be measured. These measurements may be conducted before the source device 102 is in use by the user—e.g., these measurements may be conducted by the manufacturer of the source device 102. To measure spurious emissions, a short-range wireless communications tester or spectral analyzer may be used. First, a conducted measurement may be performed with the source device 102, from which a conducted value may be derived. Conducted values may include values corresponding to the power of emissions on channels n that are offset from the channel m in which $F_c$ is included.

The conducted value may have the measured peak antenna gain relative to 0 dB-isotropic (dBi) either added thereto or subtracted therefrom. For example, if the peak antenna gain of the source device 102 is −5 dBi and the conducted value at channel $n_{+3}$ is approximately −37 dBm/MHz, then the radio emissions (also known as the ACP number or ACP measurement of the source device 102 for channel $n_{+3}$) may be equal to approximately −42 dBm/MHz (from −37 dBm-5 dB). This ACP number for channel $n_{+3}$ indicates that the source device 102 may have a margin of approximately 2 dB for channel n+3. In other words, the source device 102 may not violate the ACP parameters (including the spectral mask 152) when transmitting with a power of approximately +20 dBm, because the power of the emissions on channel $n_{+3}$ is less than the spectral mask 152 for channel $n_{+3}$.

Again with reference to FIG. 1A, the source device 102 may be configured to detect one or more conditions that are indicative of the reduction of RF power due to relatively close proximity to an absorptive object (e.g., a human body). For example, the source device 102 may not explicitly detect that the source device 102 is sufficiently proximate to the body 105 of the user so that some transmitted signal is reflected back and/or absorbed by the user's body 105; rather, the source device 102 may detect one or more conditions that are indicative of the relatively close proximate to the user's body 105 such that the source device 102 may suffer from the reduction of RF power.

In various aspects, one or more conditions indicative of the reduction of RF power may include two conditions: a first of which may be based on the rate at which the source device 102 is to retransmit data packets, and a second of which may be based on a measurement associated with an antenna gain of the at least one antenna 104 of the source device 102.

For the first condition, the source device 102 may determine a retransmission rate 120 associated with retransmissions of one or more of the first set of packets 124a by the source device 102. In one aspect, the source device 102 may determine the retransmission rate 120 over a configured time period, which may be predetermined at the source device 102. In another aspect, the source device 102 may determine the retransmission rate 120 based on a retransmission window. For example, the retransmission window may be the next transmission slot consecutively following a reception slot that includes a retransmission request (e.g., from the sink device 112). However, the retransmission window may vary according to different configurations, such as how many devices (e.g., sink devices) are actively connected with the source device 102.

The source device 102 may transmit a first set of packets 124a to the sink device 112, and the sink device 112 may receive one or more of the first set of packets 124a. However, when the source device 102 is experiencing the reduction of RF power, packet error rates/bit error rates may increase at the sink device 112. When packet error rates/bit error rates increase, the source device 102 may retransmit one or more of the first set of packets 124a.

According to various aspects, the sink device 112 may send a set of feedback messages 126 to the source device 102 based on one or more of the first set of packets 124a. In one configuration, the sink device 112 may request retransmissions of packets and, therefore, the sink device 112 may send the set of feedback messages 126 to the source device 102 indicating one or more of the first set of packets 124a that the sink device 112 requests to be retransmitted. For example, the sink device 112 may determine a respective value associated with a bit error rate for a respective one of the first set of packets 124a. If a bit error rate associated with a respective one of the first set of packets 124a satisfies (e.g., meets or exceeds) a bit-error threshold, then the sink device 112 may transmit a respective one of the set of feedback messages 126 indicating a request for retransmission of the respective one of the first set of packets 124a.

In another configuration, the sink device 112 may provide acknowledgement (ACK)/negative acknowledgement (NACK) feedback to the source device 102 for each of the first set of packets 124a. Illustratively, the sink device 112 may include, in the set of feedback messages 126, information indicating NACK feedback for a first subset of the first set of packets 124a—e.g., the first subset of the first set of packets 124a may be packets that are unsuccessfully received, unsuccessfully decoded, not received, etc. Similarly, the sink device 112 may include, in a different set of feedback messages, information indicating ACK feedback for a second subset of the first set of packets 124a—e.g., the second subset of the first set of packets 124a may be packets that are successfully received and successfully decoded.

According to one aspect, the sink device 112 may attempt to decode each of the first set of packets 124a, and the sink device 112 may determine whether each of the first set of packets 124a is successfully decoded. For example, the sink device 112 may validate each of the decoded first set of packets 124a based on a cyclic redundancy check (CRC) and/or a message integrity code (MIC) associated with each of the first set of packets 124a. If the sink device 112 successfully decodes a respective one of the first set of packets 124a (e.g., if the sink device 112 determines that the respective one of the first set of packets 124a passes CRC validation and/or passes MIC validation), then the sink device 112 may transmit ACK feedback to the source device 102 indicating that the respective one of the first set of packets 124a is successfully received and decoded. However, if the sink device 112 unsuccessfully decodes another one of the first set of packets 124a (e.g., if the sink device 112 determines that the other one of the first set of packets 124a fails CRC validation and/or fails MIC validation), then the sink device 112 may transmit NACK feedback to the source device 102 in a corresponding one of the set of feedback messages 126.

The source device 102 may transmit one or more retransmission packets of the first set of packets 124a, such as in response to each of the set of feedback messages 126. Based on at least one of the number of the set of feedback messages 126 received within a configured time period or the number of the one or more retransmission packets of the first set of packets 124a transmitted within the configured time period, the source device 102 may determine the retransmission rate 120. For example, the source device 102 may determine the retransmission rate 120 is equal to the number of the set of feedback messages 126 received within the configured time period or is equal to the number of retransmission packets of the first set of packets 124a transmitted within the configured time period.

The source device 102 may determine whether a first threshold (e.g., a predefined threshold) is satisfied based on the determined retransmission rate 120. For example, the source device 102 may compare the determined retransmission rate 120 to the first threshold. When the determined retransmission rate 120 is equal to and/or exceeds the first threshold, then the first threshold may be satisfied. When the first threshold is satisfied based on the retransmission rate 120, then the source device 102 may determine that the first condition indicative of the reduction of RF power due to relatively close proximity to an absorptive object may be met.

The determined retransmission rate 120 may be affected by alternative or additional factors; that is, one retransmission rate during one configured time period may be increased from a prior retransmission rate during a prior configured time period as a result of one or more causes other than the reduction of RF power. For example, an increased path loss (e.g., due to the source device 102 being far enough from the sink device 112 to affect the quality of the communications link 116) may cause the determined retransmission rate 120 to increase. In another example, interference on the communications link 116 may cause the determined retransmission rate 120 to increase (e.g., in-band interference caused by signals in or near the band in which the communications link 116 operates).

Increasing the transmission power with which the source device 102 transmits packets may be unsuitable to address some other causes of an increased retransmission rate and, in addition, may have some adverse effects. For example, increasing the transmission power with which the source device 102 transmits packets may cause spurious emissions to proximate devices. Further, increasing the transmission power with which the source device 102 transmits packets may consume an appreciable amount of power at the source device 102. Therefore, the determined retransmission rate 120 may be considered in combination with at least one second condition in order to improve the accuracy in determining that the source device 102 is experiencing the reduction of RF power.

For the second condition, the source device 102 may determine an antenna gain measurement 122 associated with the at least one antenna 104 of the source device 102. The source device 102 may measure any one of a number of different types of values that are indicative of antenna gain associated with the at least one antenna 104 of the source device 102. For example, an antenna gain measurement 122 may be based on a VSWR measurement and/or a decibel (dB) measurement indicating reflected RF power.

For the source device 102, the antenna gain may be correlated with VSWR and/or reflected power. In some aspects, this correlation may be specified before the source device 102 is deployed—e.g., a manufacturer of at least a portion of the source device 102 (e.g., a manufacturer of one or more components of the source device 102) may correlate antenna gain with VSWR and/or reflected power before the source device 102 is connected with the sink device 112, before the source device 102 is possessed by a consumer, and so forth. For example, a manufacturer of at least a portion of the source device 102 may measure antenna gain associated with VSWR and/or reflected power with an antenna in relatively close proximity to a human body, human body model, or another model that mimics the effects of the human body on antenna gain, such as for the acceptably accurate modeling of the reduction of RF power due to relatively close proximity to an absorptive object.

In some aspects, the source device 102 may be configured to enter into a calibration mode in which the source device 102 may receive an input indicating an antenna gain measurement (e.g., measured in a modeled scenario, such as by the manufacturer of at least a portion of the source device 102) while the source device 102 is configured to measure VSWR and/or reflected RF power at that antenna gain. The source device 102 may be configured to store a table (e.g., a lookup table) in which each of a plurality of antenna gain measurements (or a range of antenna gain measurements) is correlated with a corresponding VSWR and/or reflected RF power. Thus, when the source device 102 receives an input indicating a measured antenna gain, the source device 102 may update an entry of the table for the measured antenna gain with a VSWR and/or reflected RF power that is measured by the source device 102. For example, the source device 102 may receive an input of a first antenna gain measurement, and the source device 102 may transmit a signal (e.g., a manufacturer may provide the input of the first antenna gain measurement and cause the source device 102 to transmit the signal when modeling the reduction of RF power due to relatively close proximity to an absorptive object). The source device 102 may then measure VSWR and/or reflected RF power (e.g., using one of the approaches described herein). Accordingly, the source device 102 may update an entry of the table for the first antenna gain measurement so that the entry indicates a correlation between the first antenna gain measurement and the measured VSWR and/or reflected RF power. Other approaches to determining and/or storing a correlation between different antenna gains and corresponding measured VSWRs and/or reflected RF powers may be used without departing from the scope of the present disclosure.

When the source device 102 has established the communications link 116 with the sink device 112, the source device 102 may be configured to determine the antenna gain measurement 122. The source device 102 may measure VSWR and/or reflected RF power to determine the antenna gain measurement 122. For example, the source device 102 may measure VSWR and/or reflected RF power when the source device 102 is transmitting the first set of packets 124a. Various aspects of measuring VSWR and/or reflected RF power and correspondingly determining an antenna gain measurement 122 may be described herein, such as with respect to FIGS. 5-14.

The source device 102 may determine the antenna gain measurement 122 based on the measured VSWR and/or reflected RF power. For example, the source device 102 may access a table that indicates correspondence between a respective VSWR and/or reflected RF power and a respective antenna gain. The source device 102 may identify an entry of the table for the measured VSWR and/or reflected RF power, and the source device 102 may identify the antenna gain correlated with the measured VSWR and/or reflected RF power according to the entry of the table.

The source device 102 may determine whether a second threshold (e.g., a predefined threshold) is satisfied based on the determined antenna gain measurement 122. For example, the source device 102 may compare the determined antenna gain measurement 122 to the second threshold. When the determined antenna gain measurement 122 is equal to and/or exceeds the second threshold, then the second threshold may be satisfied. When the second threshold is satisfied based on the determined antenna gain measurement 122, then the second condition indicative of the reduction of RF power due to relatively close proximity to an absorptive object (e.g., a human body) may be met.

When the source device 102 detects that the two conditions are satisfied, then the source device 102 may adjust the transmission power 128 of the source device 102. In aspects, then, the source device 102 may increase the transmission power 128 of the source device 102 in response to a set of conditions indicative of the reduction of RF power. The source device 102 may transmit a second set of packets 124b with a transmission power that is increased relative to the transmission power with which the first set of packets 124a is transmitted. The source device 102 may transmit the second set of packets 124b with an increased transmission power of 20 dB, 15 dB, 10 dB, 5 dB, etc. According to various aspects, the source device 102 may be configured with the increased transmission power, which may be based on modeling for the source device 102 of the reduction of RF power due to relatively close proximity to an absorptive object.

To transmit the second set of packets 124b, the source device 102 may increase the transmission power to a level that may otherwise cause one or more ACP parameters (e.g., the spectral mask 152 and/or one or more BT ACP parameters) to be violated (e.g., because the body 105 may absorb some spurious emissions and/or cause some signal that would otherwise cause spurious emissions to be reflected back) and/or to a level that may be relatively expensive in terms of power consumption. In the context of FIG. 1B, for example, the source device 102 may increase the transmission power 156 to approximately +20 dBm when the source device 102 detects that both the first and second conditions indicative of the reduction of RF power due to relatively close proximity to an absorptive object are satisfied. However, as illustrated, the powers 154a-f of emissions on offset channels n may not violate the spectral mask 152 and, therefore, some ACP parameters may be respected—for example, with the increased transmission power, transmissions by the source device 102 may be within the 3 BT ACP parameter exceptions per channel, or relatively closely thereto. The source device 102 may refrain from violating the spectral mask 152 due to configurations of the source device 102 (e.g., due to radio and/or antenna design, due to transmit chain design, etc.) and/or due to the absorption and/or reflection of the emissions by the user's body 105 on the offset channels n.

When the source device 102 transmits the second set of packets 124b with the increased transmission power, the source device 102 may continue to determine the retransmission rate 120 over the configured time period and/or determine the antenna gain measurement 122. For example, the source device 102 may determine at least one of the number of the set of feedback messages 126 received within a configured time period or the number of the one or more retransmission packets of the first set of packets 124a transmitted within the configured time period When at least one of the two conditions is not satisfied, the RF energy may no longer be lost due to absorption. When the determined retransmission rate 120 fails to satisfy the first threshold and/or when the determined antenna gain measurement 122 fails to satisfy the second threshold, the source device 102 may refrain from transmitting with a relatively high transmission power (e.g., +20 dBm). Therefore, the source device 102 may adjust the transmission power 128 of the source device 102 by reducing the transmission power when the determined retransmission rate 120 fails to satisfy the first threshold and/or the determined antenna gain measurement 122 fails to satisfy the second threshold.

For example, the source device 102 may reduce the transmission power by 5 dB, 10 dB, 15 dB, 20 dB, etc., depending on the transmission power which the source device 102 is configured to reach when the reduction of RF power due to relatively close proximity to an absorptive object is indicated. In some aspects, the source device 102 may decrease the transmission power from an increased level that may otherwise cause the BT ACP parameters (e.g., the spectral mask 152) to be violated (e.g., because the body 105 may no longer absorb some spurious emissions and/or no longer cause some signal to be reflected back) and/or to a level that may be relatively more conservative in terms of power consumption.

Figure 2:
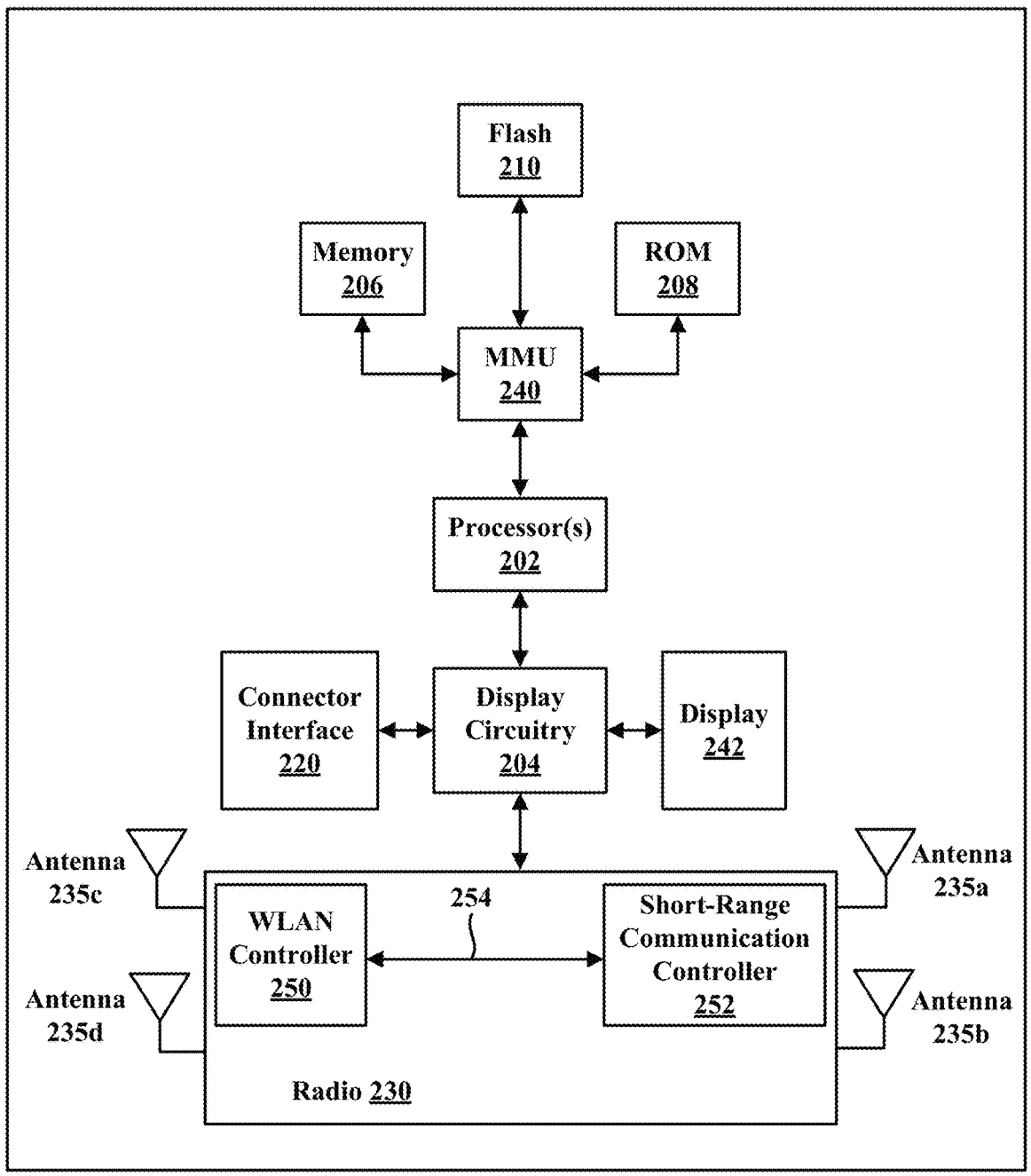
FIG. 2 is block diagram of a wireless device, in accordance with certain aspects of the disclosure.

FIG. 2 is block diagram of a wireless device 200 in accordance with certain aspects of the disclosure. According to some examples, the wireless device 200 may be implemented as the source device 102 and/or the sink device 112 in FIG. 1A. In certain configurations, the wireless device 200 may be implemented as a BT and/or BLE device that is configured to adjust a transmission power when the wireless device 200 detects that each of a set of conditions are satisfied, which may indicate the wireless device 200 is experiencing the reduction of RF power due to relatively close proximity to an absorptive object. In other aspects, the wireless device 200 may be any other wireless device operating according to one or more other standards and/or protocols that may experience one or more conditions similar or analogous to the reduction of RF power due to relatively close proximity to an absorptive object, such as an increased retransmission rate over a predefined time period and a decreased antenna gain during that time period (e.g., an increased VSWR and/or increased reflected RF power). For example, the wireless device 200 may be a WLAN device (e.g., a WLAN device configured for VoIP), a cellular device (e.g., configured for voice calls and/or data connections). Various examples of the wireless device 200 include mobile devices, handsets, tablets, headsets, wearables (e.g., smart watches, smart glasses, etc.), medical sensors, IoT devices, and so forth.

As shown in FIG. 2, the wireless device 200 may include a processing element, such as a processor(s) 202, which may execute program instructions for the wireless device 200. The wireless device 200 may also include display circuitry 204, which may perform graphics processing and provide display signals to a display 242. The processor(s) 202 may also be coupled to a memory management unit (MMU) 240, which may be configured to receive addresses from the processor(s) 202 and translate those addresses to locations in memory (e.g., memory 206, ROM 208, Flash memory 210) and/or to other circuits or devices, such as the display circuitry 204, a radio 230, a connector interface 220, and/or the display 242. The MMU 240 may be configured to perform memory protection and page table translation or set up. In some aspects, the MMU 240 may be included as a portion of the processor(s) 202.

As shown, the processor 202 may be coupled to various other circuits of the wireless device 200. For example, the wireless device 200 may include various types of memory, the connector interface 220 (e.g., for coupling to the computer system), the display 242, and/or wireless communications circuitry (e.g., for Wi-Fi, BT, BLE, etc.). The wireless device 200 may include a plurality of antennas 235a, 235b, 235c, 235d, for performing wireless communication with other short-range wireless communications devices (e.g., BT devices, BLE devices, etc.).

In certain aspects, the wireless device 200 may include hardware and software components (a processing element) configured to determine a retransmission rate associated with retransmission of one or more packets by the wireless device 200, determine a measurement associated with an antenna gain of at least one antenna of the wireless device 200, and adjust a transmission power of the wireless device 200 based on the determined retransmission rate and based on the measurement associated with the antenna gain. The wireless device 200 may also include firmware or other hardware/software for controlling short-range wireless communications operations (e.g., BT operations, BLE operations, etc.). Additionally or alternatively, the wireless device 200 may include, store, and/or execute hardware, software, and/or firmware for controlling and communicating according to one or more other wireless communications technologies (e.g., WLAN, cellular RAT(s), etc.).

In certain aspects, the WLAN controller 250 may be configured to communicate with a second device using a WLAN link using all of the antennas 235a, 235b, 235c, 235d. In certain configurations, the short-range communications controller 252 may be configured to implement a short-range wireless communications protocol stack, such as a BT stack (see, e.g., FIG. 3A, infra) and/or a BLE stack (see, e.g., FIG. 3B, infra), and communicate with at least one second wireless device using one or more of the antennas 235a, 235b, 235c, 235d.

The wireless device 200 may be configured to implement part or all of the techniques associated with the reduction of RF power due to relatively close proximity to an absorptive object, such as described in the present disclosure by executing program instructions stored on a memory medium (e.g., a non-transitory computer-readable memory medium), through hardware configuration(s)/operation(s), and/or through firmware configuration(s)/operation(s). In some aspects, the techniques associated with the reduction of RF power due to relatively close proximity to an absorptive object described in the present disclosure may be at least partially implemented by a programmable hardware element, such as an field programmable gate array (FPGA), and/or as an application specific integrated circuit (ASIC).

In certain aspects, the radio 230 may include separate controllers configured to control communications for various respective radio access technology (RAT) protocols. For example, as shown in FIG. 2, radio 230 may include a wireless local area network (WLAN) controller 250 configured to control WLAN communications and a short-range communications controller 252 configured to control short-range communications (e.g., BT communications, BLE communications, etc.). A coexistence interface 254 (e.g., a wired interface) may be used for sending information between the WLAN controller 250 and the short-range communications controller 252.

In some aspects, one or more of the WLAN controller 250 and/or the short-range communications controller 252 may be implemented as hardware, software, firmware or some combination thereof.

The short-range communications controller 252 may be configured to determine a retransmission rate associated with retransmission of one or more packets by the wireless device 200. The short-range communications controller 252 may be configured to determine a measurement associated with an antenna gain of at least one antenna 235a, 235b, 235c, 235d of the wireless device 200. The short-range communications controller 252 may be configured to adjust a transmission power of the wireless device 200 based on the retransmission rate and based on the measurement associated with the antenna gain of the at least one antenna 235a, 235b, 235c, 235d of the wireless device 200. In an aspect, the measurement associated with the antenna gain includes at least one of a VSWR measurement or a dB measurement indicating reflected RF power. The retransmission rate may be determined based on a number of one or more packets retransmitted by the wireless device 200 or based on a number of requests received by the wireless device 200 for retransmission of one or more packets.

In one aspect, the adjustment of the transmission power of the wireless device 200 may include to increase the transmission power of the wireless device 200 when the retransmission rate satisfies a first threshold and when the measurement associated with the antenna gain satisfies a second threshold, and the increased transmission power may exceed a threshold transmission power configured for the wireless device 200 based on an ACP standard, such as at least one spectral mask. In another aspect, the adjustment of the transmission power of the wireless device 200 may include to decrease the transmission power of the wireless device 200 when the retransmission rate fails to satisfy a first threshold and/or when the measurement associated with the antenna gain fails to satisfy a second threshold, and the decreased transmission power may be decreased from an increased transmission power that exceeds a threshold transmission power configured for the wireless device 200 based on an ACP standard, such as a spectral mask 152, and the decreased transmission power may be lower than the threshold transmission power.

As will be further described, infra, the wireless device 200 may include a power detection circuit configured to detect the measurement. The short-range communications controller 252 may be configured to determine the measurement associated with the antenna gain based on activation of the power detection circuit for detection of the measurement associated with the antenna gain and, further, may be configured to adjust the transmission power based on correspondence between the detected measurement and the adjusted transmission power.

In another aspect further described, infra, the wireless device 200 may include a receiver circuit configured to detect a reflected signal via the at least one antenna 235a, 235b, 235c, 235d of the wireless device 200. The short-range communications controller 252 may be configured to determine the measurement associated with the antenna gain based on the reflected signal, and may be configured to adjust the transmission power based on at least one of a differential error vector magnitude (DEVM) and/or based on an ACP measurement associated with the reflected signal.

In another aspect further described, infra, the wireless device 200 may include a comparator circuit that is configured to detect the measurement associated with the antenna gain. The comparator circuit may be configured to deactivate an attenuator when the detected measurement satisfies a second threshold. When the short-range communications controller 252 determines that the retransmission rate satisfies a first threshold, the short-range communications controller 252 may be configured to determine the measurement associated with the antenna gain and adjust the transmission power based on the activation of the comparator circuit for the detection of the measurement and the deactivation of the attenuator.

In another aspect further described, infra, the wireless device 200 may include a comparator circuit that is configured to detect the measurement associated with the antenna gain. The comparator circuit may be configured to increase a gain of an external power amplifier connected with the at least one antenna 235a, 235b, 235c, 235d when the detected measurement satisfies a second threshold. When the short-range communications controller 252 determines that the retransmission rate satisfies a first threshold, the short-range communications controller 252 may be configured to determine the measurement associated with the antenna gain and adjust the transmission power based on the activation of the comparator circuit for the detection of the measurement and the increase of the gain of the external power amplifier.

In another aspect further described, infra, at least one other antenna 235a, 235b, 235c, 235d may be associated with a receive chain that is different from a transmit chain associated with the at least one antenna 235a, 235b, 235c, 235d. The short-range communications controller 252 may be configured to determine the measurement based on a reflected signal detected via the at least one other antenna.

Figure 3A:
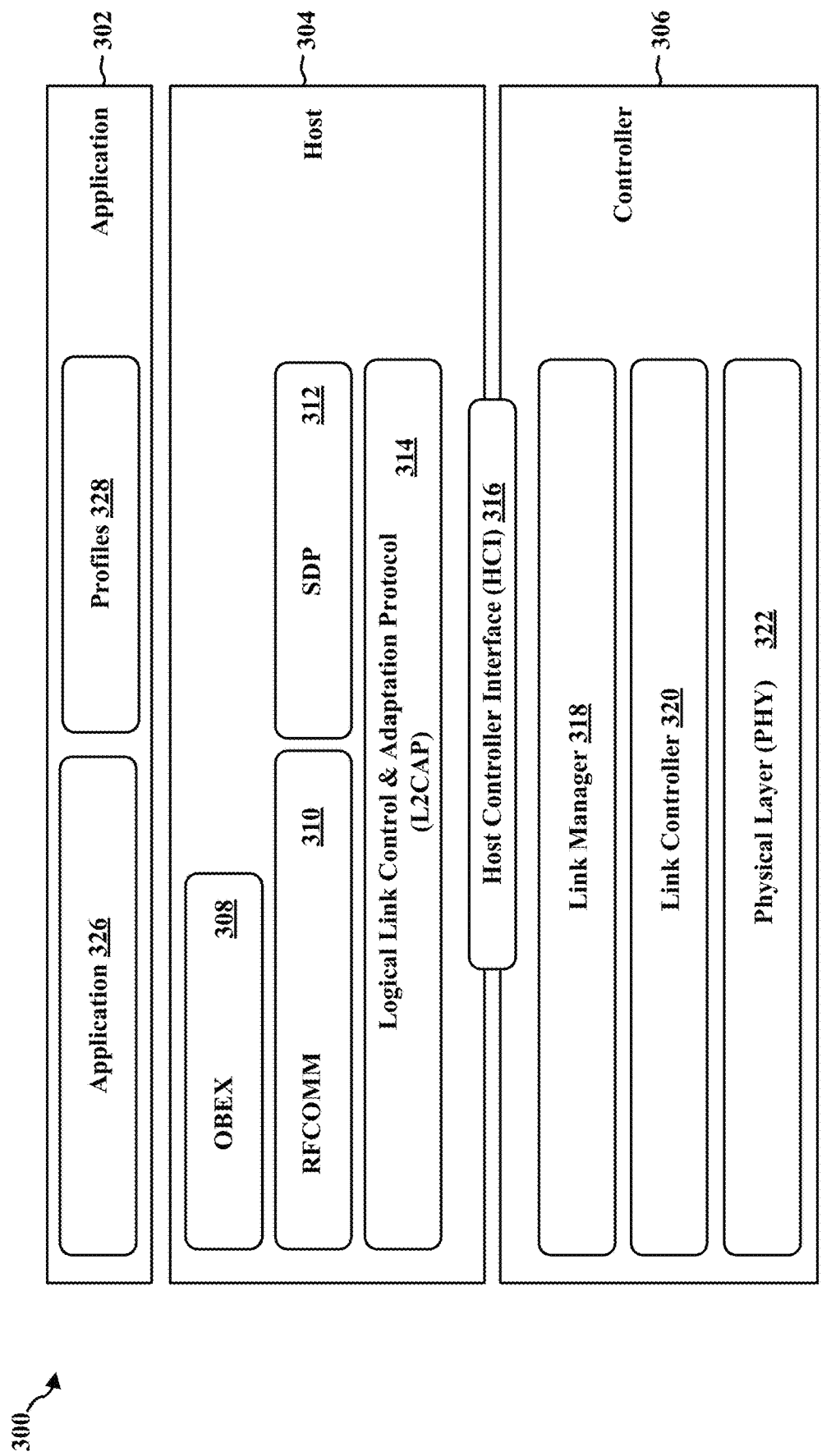
FIG. 3A is a diagram illustrating a protocol stack, in accordance with certain aspects of the disclosure.

FIG. 3A illustrates a BT protocol stack 300 that may be implemented in a wireless device in accordance with certain aspects of the disclosure. For example, the BT protocol stack 300 may be implemented by one or more of processor(s) 202, memory 206, Flash memory 210, ROM 208, the radio 230, and/or the short-range communications controller 252 illustrated in FIG. 2.

Referring to FIG. 3A, the BT protocol stack 300 may be organized into lower layer(s), a middle layer(s), and upper layer(s). The lower layer(s) of the BT protocol stack 300 may include a controller stack 306, which may be used for, inter alia, hardware interface management, link establishment, and link management. The middle layer(s) of the BT protocol stack 300 may include a host stack 304, which may be used for, inter alia, application (layer) interface management to allow an application (layer) to access short-range wireless communications. The higher layer(s) of the BT protocol stack 300 may include an application layer 302, which may include one or more applications and one or more profiles that allow the one or more applications to use BT communications.

The controller stack 306 may include a physical (PHY) layer 322. The PHY layer 322 may include, for example, a radio and/or a baseband processor. In some aspects, the PHY layer 322 may define the mechanism for transmitting a bit stream over a physical link or channel that connects BT devices. The bit stream may be grouped into code words or symbols, and converted to a data packet that is transmitted over a wireless transmission medium. The PHY layer 322 may provide an electrical, mechanical, and/or procedural interface to the wireless transmission medium. The PHY layer 322 may be responsible for modulation and demodulation of data into RF signals for transmission over the air. The PHY layer 322 may describe the physical characteristics of a wireless device's receiver/transmitter. The physical characteristics may include modulation characteristics, radio frequency tolerance, sensitivity level, etc.

The controller stack 306 may further include a link controller 320. The link controller 320 may be responsible for properly formatting data for providing to and obtaining from the PHY layer 322. Further, the link controller 320 may perform synchronization of links (e.g., logical links including ACL links, A2DP links, SCO links, eSCO links, ISO links, etc.). The link controller 320 may be responsible for executing commands and instructions issued by a link manager 318, including establishing and maintaining links instructed by the link manager 318.

The link manager 318 may translate host controller interface (HCI) 316 commands into controller-level operations (e.g., baseband-level operations). The link manager 318 may be responsible for establishing and configuring links and managing power-change requests, among other tasks. Each type of logical link (e.g., ACL links, A2DP links, SCO links, eSCO links, ISO links, etc.) may be associated with a specific packet type. For example, an SCO link may provide reserved channel bandwidth for communication between a master device and a slave device, and support regular, periodic exchange of data packets with no retransmissions. An eSCO link may provide reserved channel bandwidth for communication between a master device and a slave device, and support regular, periodic exchange of data packets with retransmissions. An ACL link may exist between a master device and a slave device from the beginning of establishment of a connection between the master device and the slave device, and the data packets for ACL links may include encoding information in addition to a payload.

The link manager 318 may communicate with the host stack 304 through a host controller interface (HCI) 316—e.g., the link manager 318 may translate HCI 316 commands into controller-level operations (e.g., baseband-level operations). The HCI 316 may act as a boundary between the lower layers (e.g., the controller stack 306) of the BT protocol stack 300 and the other layers of the BT protocol stack (e.g., the host stack 304 and the application layer 302). The BT specification may define a standard HCI to support BT systems that are implemented across two separate processors. For example, a BT system on a computer might use the BT system's own processor to implement the lower layers of the stack (e.g., the PHY layer 322, the link controller 320, and/or the link manager 318). The BT system might use a processor of a BT component to implement the other layers (e.g., the host stack 304 and the application layer 302). In some aspects, however, the BT system may be implemented on a same processor, and such a BT system may be referred to as "hostless."

The host stack 304 may include at least a Logical Link Control and Adaptation Protocol (L2CAP) layer 314, a service discovery protocol (SDP) layer 312, a radio frequency communication (RFCOMM) layer 310, and an object exchange (OBEX) layer 308. The L2CAP layer 314 is implemented above the HCI 316, and may communicate through the HCI 316. The L2CAP layer 314 may be primarily responsible for establishing connections across some existing links (e.g., logical links, including ACL links) and/or requesting some links (e.g., logical links, including ACL links) if those do not already exist. Further, the L2CAP layer 314 may implement multiplexing between different higher-layer protocols, such as SDP protocols and RFCOMM protocols, which may to allow different applications to use a single link (e.g., a logical link, including an ACL link). In addition, the L2CAP layer 314 may repackage data packets received from higher layers into a format expected by lower layers. The L2CAP layer 314 may employ the concept of channels to keep track of where data packets come from and where data packets should go. A channel may be a logical representation of the data flow or stream between the L2CAP layer 314 at a transmitting device (e.g., a master device) and another L2CAP layer 314 at a receiving device (e.g., a slave device).

The SDP layer 312 may define actions for both servers and clients of BT services. The BT specification defines a service as any feature that may be usable by another (remote) BT device. An SDP client may communicate with an SDP server using a reserved channel on an L2CAP link to discover what services are available. When the SDP client finds the desired service, the SDP client may request a separate connection to use the service. The reserved channel may be dedicated to SDP communication so that a device knows how to connect to the SDP service on any other device. An SDP server may maintain an SDP database, which may include a set of service records that describe the services the SDP server offers. Along with information describing how an SDP client can connect to the service, the service records may contain a universally unique identifier (UUID) of the service.

The RFCOMM layer 310 may emulate the serial cable line settings and status of an RS-232 serial port. The RFCOMM layer 310 may connect to the lower layers of the BT protocol stack 300 through the L2CAP layer 314. By providing serial-port emulation, the RFCOMM layer 310 may support legacy serial-port applications. The RFCOMM layer 310 may also support the Object Exchange (OBEX) layer 308.

The OBEX layer 308 may define a communication protocol that may be used by devices to exchange data objects, and the data objects may also be defined by the OBEX layer 308. A BT device that wants to set up an OBEX communication session with another device may be considered the client device. The client initially may send one or more SDP requests to ensure that the other device can act as a server of OBEX services. If the server device can provide OBEX services, the server device may respond with the OBEX service record of the server device. The OBEX service record may contain an RFCOMM channel number that the client device may use to establish an RFCOMM channel. Further communication between the two devices may be conveyed in packets, which may contain requests, responses, and/or data. The format of the packet may be defined by the OBEX session protocol.

The application layer 302 may include at least one application 326, with which a user may interact and which may access BT communications for various functionality. The application 326 may access BT communications through one or more profiles 328, which may describe a variety of different types of tasks. By following procedures of one or more profiles 328, the application 326 may use BT communications according to a BT specification.

Figure 3B:
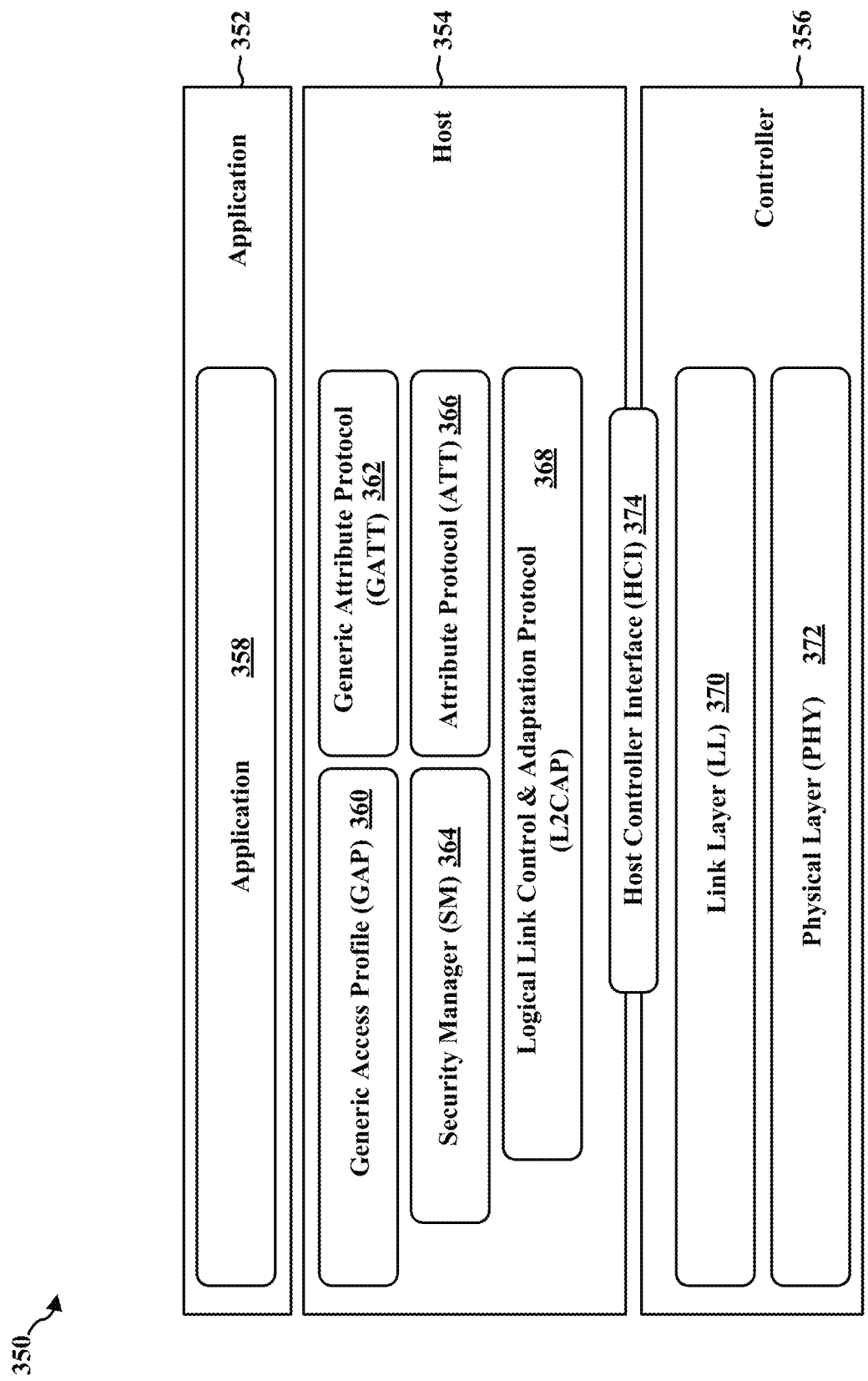
FIG. 3B is a diagram illustrating a protocol stack, in accordance with certain aspects of the disclosure.

FIG. 3B illustrates a BLE protocol stack 350 that may be implemented in a BLE device. For example, the BLE protocol stack 350 may be implemented by one or more of processor(s) 202, memory 206, Flash memory 210, ROM 208, the radio 230, and/or the short-range communications controller 252 illustrated in FIG. 2.

The BLE protocol stack 350 may be organized into three layers, which may include, an application layer 352, a host stack 354, and a controller stack 356. The controller stack 356 may be below the host stack 354 and the application layer 352 in the BLE protocol stack 350. The controller stack 356 may include a PHY layer 372 and a LL 370.

The PHY layer 372 may define the mechanism for transmitting a bit stream over a physical link that connects BLE devices. The bit stream may be grouped into code words or symbols, and converted to a data packet that is transmitted over a transmission medium. The PHY layer 372 may provide an electrical, mechanical, and procedural interface to the transmission medium. The shapes and properties of the electrical connectors, the frequency band used for transmission, the modulation scheme, and similar low-level parameters may be specified by the PHY layer 372.

The LL 370 is responsible for low-level communication over the PHY layer 372. The LL 370 manages the sequence and timing for transmitting and receiving data packets, and using a LL protocol, communicates with other devices regarding connection parameters and data flow control. The LL 370 also provides gatekeeping functionality to limit exposure and data exchange with other devices. If filtering is configured, the LL 370 maintains a list of allowed devices and will ignore all requests for data exchange from devices not on the list. The LL 370 may also reduce power consumption. In some aspects, the LL 370 may include a company's proprietary LL that may be used to discover peer devices (e.g., other devices associated with the company), and establish a secure communication channel therewith. In certain aspects, the LL 370 may be responsible for transporting data packets between devices in a WPAN. Each data packet may include an access address, which specifies the type of logical transport used to carry the data packet. Logical transports may exist between a master device and slave devices. Additionally, some logical transports may carry multiple logical links.

The BLE protocol stack 350 may include an HCI 374, which may act as a boundary between the lower layers (e.g., the controller stack 356) of the BLE protocol stack 350 and the other layers of the BLE protocol stack (e.g., the host stack 354 and the application layer 352). In addition, the host stack 354 may communicate with a BLE controller (e.g., short-range communications controller 252 in FIG. 2) in a wireless device using the HCI 374. The LL 370 may use the HCI 374 to communicate with the host stack 354 of the BLE protocol stack 350. While some BLE systems may be "hostless," in that the host stack 354 and the controller stack 356 may be implemented on a same processor, the HCI 374 may also allow the host stack 354 to communicate with different controller stacks 356, such as when the controller stack 356 is implemented on a second processor.

The host stack 354 may include a generic access profile (GAP) 360, a generic attribute protocol (GATT) 362, a security manager (SM) 364, an attribute protocol (ATT) 366, and an L2CAP layer 368. The L2CAP layer 368 may encapsulate multiple protocols from the upper layers into a data packet format (and vice versa). The L2CAP layer 368 may also break packets with a large data payload from the upper layers into multiple packets with the data payload segmented into smaller size data payloads that fit into a maximum payload size (e.g., twenty-seven bytes) on the transmit side. Similarly, the L2CAP layer 368 may receive multiple data packets carrying a data payload that has been segmented, and the L2CAP layer 368 may combine the segmented data payload into a single data packet carrying the data payload that will be sent to the upper layers (e.g., the application layer 352).

The ATT 366 includes a client/server protocol based on attributes associated with a BLE device configured for a particular purpose (e.g., monitoring heart rate, temperature, broadcasting advertisements, etc.). The attributes may be discovered, read, and written by peer devices. The set of operations which are executed over ATT 366 may include, but are not limited to, error handling, server configuration, find information, read operations, write operations, queued writes, etc. The ATT 366 may form the basis of data exchange between BLE devices.

The SM 364 may be responsible for device pairing and key distribution. A security manager protocol implemented by the SM 364 may define how communications with the SM of a counterpart BLE device are performed. The SM 364 provides additional cryptographic functions that may be used by other components of the BLE protocol stack 350. The architecture of the SM 364 used in BLE is designed to minimize recourse requirements for peripheral devices by shifting work to an assumingly more powerful central device. BLE uses a pairing mechanism for key distribution. The SM 364 provides a mechanism to not only encrypt the data but also to provide data authentication.

Above the host stack 354 in the BLE protocol stack 350, the application layer 352 may include an application 358, such as a user application which interfaces with the host stack 354 of the BLE protocol stack 350 for various functionality through BLE communications.

Referring back to the host stack 354, the GATT 362 may provide a service framework using the attribute protocol for discovering services, and for reading and writing characteristic values on a peer device. The GATT 362 may interface with the application 358, such as through a profile that may define a collection of attributes and/or permission(s) needed for the attributes to be used in BLE communications. The GAP 360 may provide an interface for the application 358 to initiate, establish, and manage connections with other BLE devices.

In some aspects, a wireless device (e.g., the source device 102, the wireless device 200, etc.) may be configured to communicate according to different standards and/or protocols. For example, the wireless device may be configured with both BT and BLE for short-range wireless communications. Accordingly, the wireless device may be configured with both the BT protocol stack 300 and the BLE protocol stack 350. In some aspects, one or more layers may be configured for use in both the BT protocol stack 300 and the BLE protocol stack 350—e.g., the L2CAP layers 314, 368 of the protocol stacks 300, 350 may be configured for dual mode short-range wireless communications using either BT or BLE.

Figure 4A:
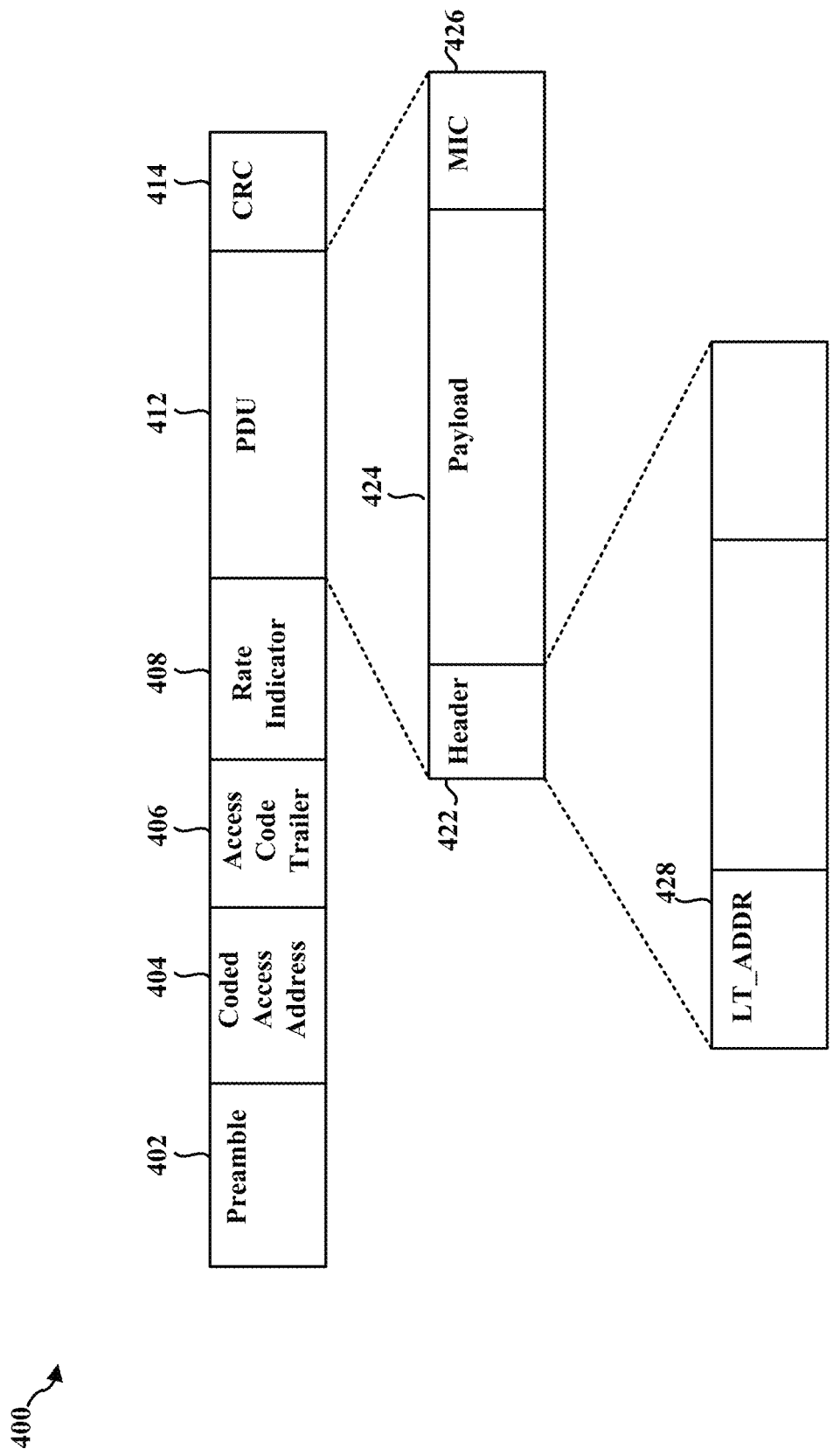
FIG. 4A is a diagram illustrating a packet, in accordance with certain aspects of the disclosure.

FIG. 4A is a diagram illustrating a data packet 400 in accordance with certain aspects of the present disclosure. The data packet may be used with various short range wireless communications technologies, such as BT. For example, in the context of FIG. 1A, the data packet 400 may be one of the first set of packets 124a and/or one of the second set of packets 124b.

The data packet 400 may include a preamble 402, a sync word 404, a trailer 406, a PDU 412, and a CRC 414. In certain configurations, the data packet 400 may not include the CRC 414.

In certain configurations, the PDU 412 may include a header 422, a payload 424, and a MIC 426. The MIC includes information that may be used to authenticate a data packet, such as when the data packet is encrypted. In other words, the MIC may be used by the receiving device to confirm that the message came from the stated transmitting device (e.g., data packet authenticity), and to confirm that the payload 424 has not been changed (e.g., data packet integrity). The MIC protects both payload integrity and the authenticity of the data packet 400 by enabling a receiving device who also possess the secret key to detect any changes to the payload 424.

In some aspects, the header 422 of the PDU 412 may include a plurality of fields, including at least an LT_ADDR 428. The LT_ADDR may indicate a logical transport address. The LT_ADDR 428 may be associated with a logical link. For example, a logical transport address included in the LT_ADDR 428 may indicate a type of logical link (e.g., ACL, A2DP, eSCO, ISO, etc.).

Figure 4B:
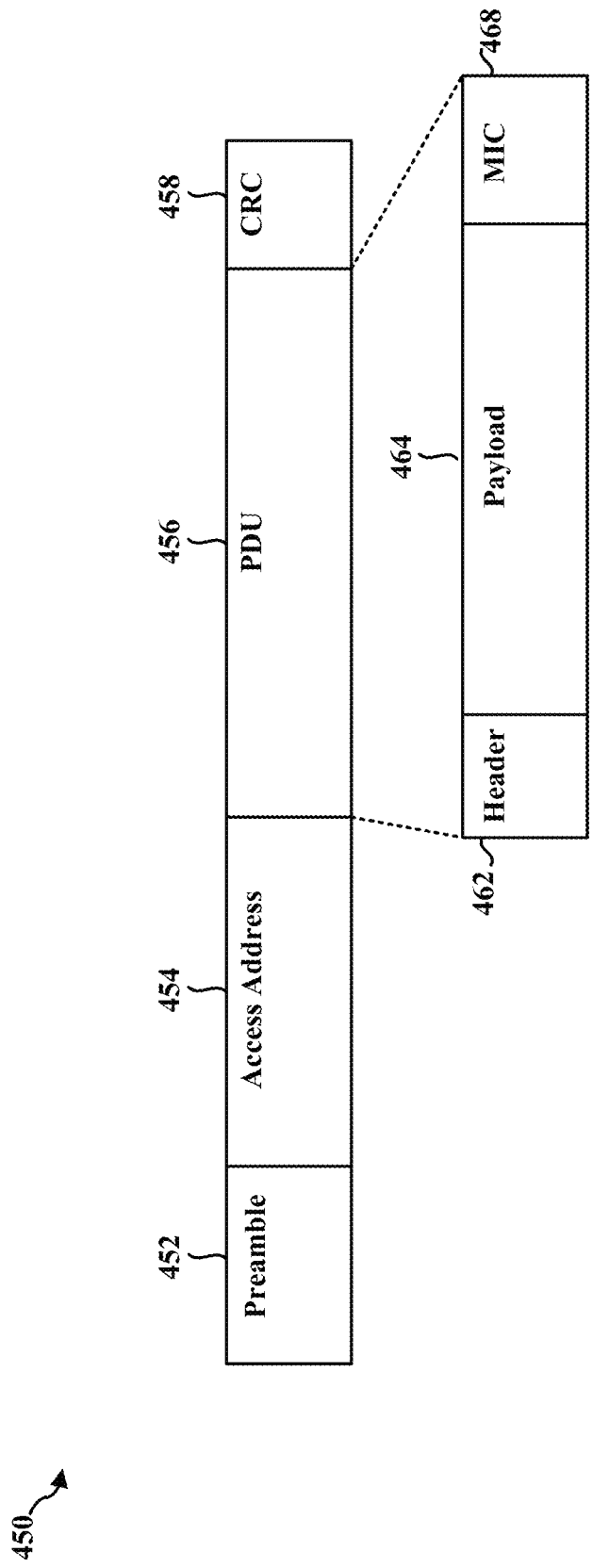
FIG. 4B is a diagram illustrating a packet, in accordance with certain aspects of the disclosure.

FIG. 4B is a diagram illustrating a data packet 450 in accordance with certain aspects of the present disclosure. The data packet may be used with various short range wireless communications technologies, such as BLE. For example, in the context of FIG. 1A, the data packet 400 may be one of the first set of packets 124a and/or one of the second set of packets 124b.

The data packet 450 may include a preamble 452, an access address 454, a PDU 456, and a CRC 458. In certain configurations, the data packet 450 may not include the CRC 458.

In some aspects, the access address 454 may set the address of a link layer (e.g., the link layer 370) connection. For example, the access address 454 may include an address that indicates a type of logical link (e.g., ACL, A2DP, eSCO, ISO, etc.).

In certain configurations, the PDU 456 may include a header 462, a payload 464, and a MIC 468. The MIC includes information that may be used by to authenticate a data packet, such as when the data packet is encrypted. In some aspects, the header 462 of the PDU 456 may include a plurality of fields, including at least a logical link identifier (LLID). The LT_ADDR may indicate a logical transport address.

Figure 5:
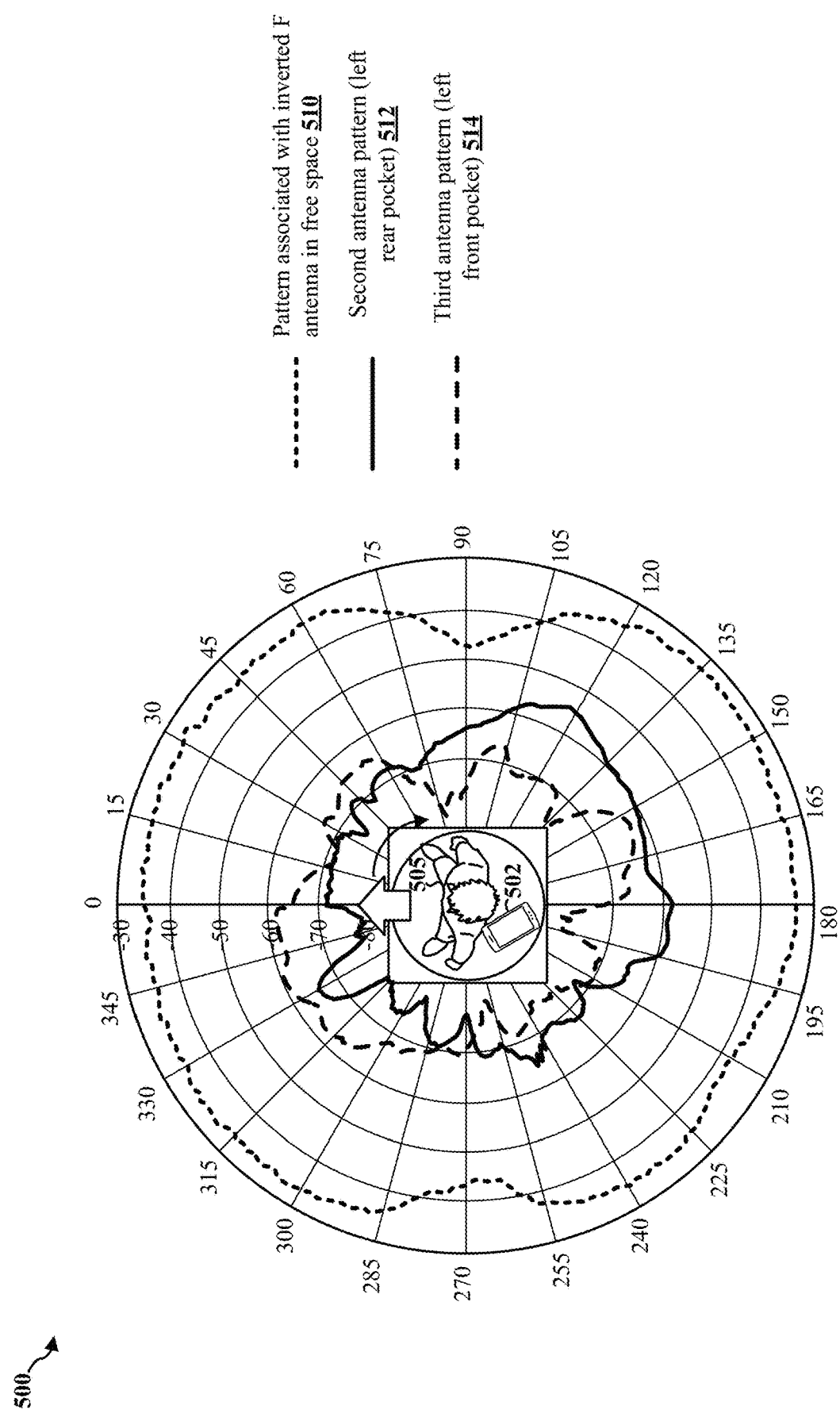
FIG. 5 is a diagram illustrating a wireless communications environment, in accordance with certain aspects of the disclosure.

FIG. 5 illustrates a wireless communications environment 500, in accordance with various aspects of the present disclosure. In the wireless communications environment 500, a user 505 may possess a source device 502. For example, the source device 502 may be the source device 102 of FIG. 1A. The source device 502 may establish a wireless connection with a sink device (e.g., the sink device 112 of FIG. 1A).

The source device 502 may transmit data packets. In so doing, the source device 502 may emit an antenna radiation pattern. When the source device 502 is in free space (e.g., the user 505 does not absorb emissions, RF signals are not reflected back to the source device 502, etc.), the source device 502 may emit the inverted F antenna pattern 510.

When the source device 502 is placed near the user 505 (e.g., in clothing, in a pocket, etc.), the antenna radiation pattern may degrade from the inverted F antenna pattern 510. For example, the minimum peak antenna gain may be reduced by more than 15 dB in the area approximately between 90 and 120 degrees.

The antenna radiation pattern may be degraded relative to the inverted F antenna pattern 510 based on where the source device 502 is located relative to the user 505. For example, the source device 502 may emit a second antenna radiation pattern 512 when the source device 502 is located in the left rear pocket of the user 505. In another example, the source device 502 may emit a third antenna radiation pattern 514 when the source device 502 is located in the left front pocket of the user 505.

The associated VSWR observed at an antenna of the source device 502 may be degraded (e.g., the VSWR may be approximately between 1.2 and 5). This degradation may increase the reflected power between the antenna and the transmitter circuit, and the source device 502 may measure and store this increase in reflected power.

As FIG. 5 illustrates, the measurement of the VSWR and/or antenna reflected power may be substantially indicative of the environment in which a device (e.g., the source device 502) is located, such as the environment 500. In particular, the VSWR and/or antenna reflected power may be indicative of the gain of at least one antenna via which a device transmits signals. The VSWR and/or antenna reflected power may be measured in one or more different ways. For example, a coupler used for WLAN closed loop power control (CLPC) may be used to measure reflected power, which may be caused by the absorptive body of the user 505.

The degraded antenna patterns 512, 514 (degraded relative to the inverted F antenna pattern 510) may be associated with VSWR. For example, a reflected power measured by a device may be stored in memory (e.g., stored in one or more registers), while an antenna radiation pattern (e.g., similar to the second and third patterns 512, 514) is captured. The minimum reduction in an antenna radiation pattern due to a human body (or similar entity) may be used to set the absolute maximum transmission power allowed for the device while still complying with BT ACP specifications (e.g., due to the increase in radiation losses, which may reduce the measured ACP in turn).

As described herein, a reduction of a minimum antenna radiation pattern may be overcome by a corresponding increase in transmission power. However, a relatively significant reduction in a minimum antenna radiation pattern may not be practically addressed by an equal increase in transmission power. For example, a 15 dB increase in transmission power may be impractical to counteract a 15 dB reduction in the minimum antenna radiation pattern, and a 15 dB increase in transmission power would be unnecessarily large to overcome the reduction of RF power due to relatively close proximity to an absorptive object. Instead, an increase in transmission power that is relatively smaller than the reduction in the minimum antenna radiation pattern, but the increase may still be commensurate with the reduction in the minimum antenna radiation pattern.

For example, a reduction in the minimum antenna radiation pattern of approximately 15 dB may correspond with a maximum allowed transmission power increase of 5 dB. If the transmission power of a device in free space is +15 dBm, then the reduction of RF power may be overcome with the 5 dB because the device's +15 dBm transmission power in free space with the maximum allowable transmission power increase of 5 dB would yield a transmission power of +20 dBm. The increased transmission power of +20 dBm may improve signal quality between the source device 502 and a sink device, and may address the degraded antenna patterns 512, 514. Therefore, a transmission power of +20 dBm may be sufficient to overcome the reduction of RF power, such as when the device is in the pocket of the user 505.

Various devices may be limited to approximately +13 dBm to +15 dBm output power (as measured at a transmission pin of a connectivity chip); however, this limitation may be due to ACP parameter marginalities and failures without any emissions, such as those that may be considered the per-channel exceptions allowed under the BT Specification. However, such limitations on output power may be removed and/or absent on some existing and/or future devices so that these devices may reach the maximum allowable output power of +20 dBm EIRP, such as in order to overcome the reduction of RF power while still observing the ACP parameters (e.g., as illustrated with respect to the spectral mask 152 of FIG. 1B).

Figure 6:
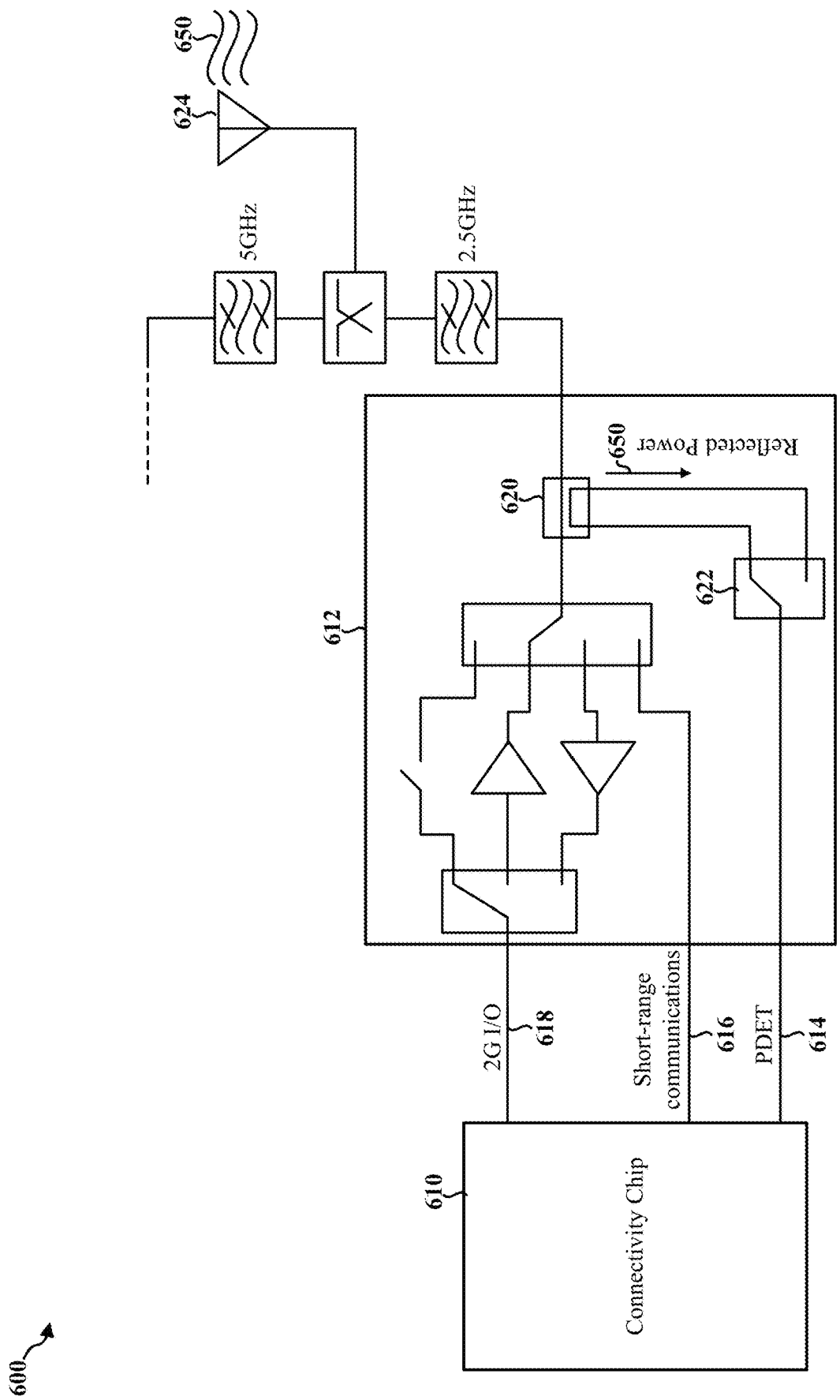
FIG. 6 is a diagram illustrating a wireless communications device, in accordance with certain aspects of the disclosure.

FIG. 6 is a block diagram of a source device 600. The source device 600 may be the source device 102 of FIG. 1A. The source device 600 may include a connectivity chip 610, which may control some functions of the short-range communications circuitry 616 and/or WLAN circuitry 618 through software and/or firmware. The source device 600 may further include a circuit 612, which may include RF frontend circuitry. In some aspects, the connectivity chip 610 may include the circuit 612, and the illustrated connectivity chip 610 may include software and/or firmware. The circuit 612 may be used for the short-range communications circuitry 616 and the WLAN circuitry 618. The circuit 612 may be designed to detect supplied RF power—that is, power that is to be supplied for signal transmission. The circuit 612 may implement a CLPC coupler 620.

In some aspects, the circuit 612 may comprise a power detector (PDET) 614. The connectivity chip 610 may be configured to determine whether the first condition indicative of the reduction of RF power; that is, the connectivity chip 610 may determine the retransmission rate of one or more packets that are transmitted by the source device 600. When the retransmission rate satisfies a first threshold, the circuit 612 may be used to determine the measurement associated with the gain of the antenna 624. For example, the connectivity chip 610 may activate the circuit 612 for detection of reflected RF power 650 when the retransmission rate satisfies the first threshold.

When the source device 600 is occluded during transmission of a set of packets, the reflected RF power 650 may be measured from a portion of a signal coming from the circuit 612 that is reflected at the antenna 624. The portion of the signal coming from the circuit 612 may be reflected at the antenna 624 due to antenna mismatch, which may be caused by an absorptive object in relative close proximity to the source device 600. The reflected RF power 650 may be indicative of the gain of the antenna 624. The circuit 612 may be configured to detect reflected RF power using the power detector 614, which may be a scalar power detector.

In the circuit 612, an RF switch 622 may be included. The RF switch 622 may cause either the output of the CLPC coupler 620 for the WLAN circuitry 618 (e.g., for detection of applied RF power during WLAN transmission) or the reflected RF power 650 to be routed to the power detector 614. An isolated port of the coupler 620 may be used for detection of the reflected RF power 650.

In some aspects, when the connectivity chip 610 determines that the retransmission rate satisfies the first threshold, the connectivity chip 610 may activate the circuit 612 for detection of the reflected RF power measurement by causing the RF switch 622 to route reflected RF power 650 to the power detector 614. Accordingly, the power detector 614 may measure the reflected RF power 650 when the short-range communications circuitry 616 transmits a signal (e.g., a data packet). The measurement by the power detector 614 may include a dB value indicative of the reflected RF power 650.

The power detector 614 may supply the measurement of the reflected RF power 650 to the connectivity chip 610. The connectivity chip 610 may determine whether the measurement of the reflected RF power 650 satisfies a second threshold. When the measurement of the reflected RF power 650 satisfies a second threshold, then the connectivity chip 610 may cause the short-range communications circuitry 616 to increase transmission power.

In one aspect, the short-range communications circuitry 616 may increase the transmission power based on a lookup table. For example, the connectivity chip 610 may access a lookup table that includes a set of entries. Each entry may indicate a reflected RF power measurement value (or a range of reflected RF power measurement values) and a corresponding increase to the transmission power. Thus, when the power detector 614 detects a reflected RF power measurement that is relatively low, a relatively lower increase to the transmission power may be applied. Accordingly, the increase to the transmission power may be commensurate with the reflected RF power 650.

In another aspect, the short-range communications circuitry 616 may increase the transmission power based on an algorithm. For example, the connectivity chip 610 may execute an algorithm based on a reflected RF power measurement supplied by the power detector 614. In some aspects, the algorithm may be based on curve-fitting anechoic chamber lab measurement results, which may correlate VSWR to peak antenna gain reduction when antenna performance is measured on a human body or human body model. The execution of the algorithm may yield an increase to the transmission power, which may be applied by the short-range communications circuitry 616. Accordingly, the increase to the transmission power may be calculated to correspond with the reflected RF power 650.

As described, supra, the lookup table may be preconfigured for the device 600. For example, the lookup table may be populated in a calibration mode by the manufacturer of the device 600, such as when the reduction of RF power due to relatively close proximity to an absorptive object (e.g., a human body) is modeled. Similar, the aforementioned algorithm may be updated for the device 600. For example, one or more variables and/or functions of the algorithm may be calibrated when the reduction of RF power due to absorption is modeled in order for the algorithm to (relatively) accurately correlate an antenna gain measurement with reflected RF power 650 (and/or VSWR).

The use of the power detector 614 coupled with the antenna 624 may reduce power consumption relative to other approaches to detecting reflected RF power. In particular, the power consumption may be reduced because the power detector 614 does not use a receive chain of the short-range communications circuitry 616 to detect the reflected RF power 650.

Figure 7:
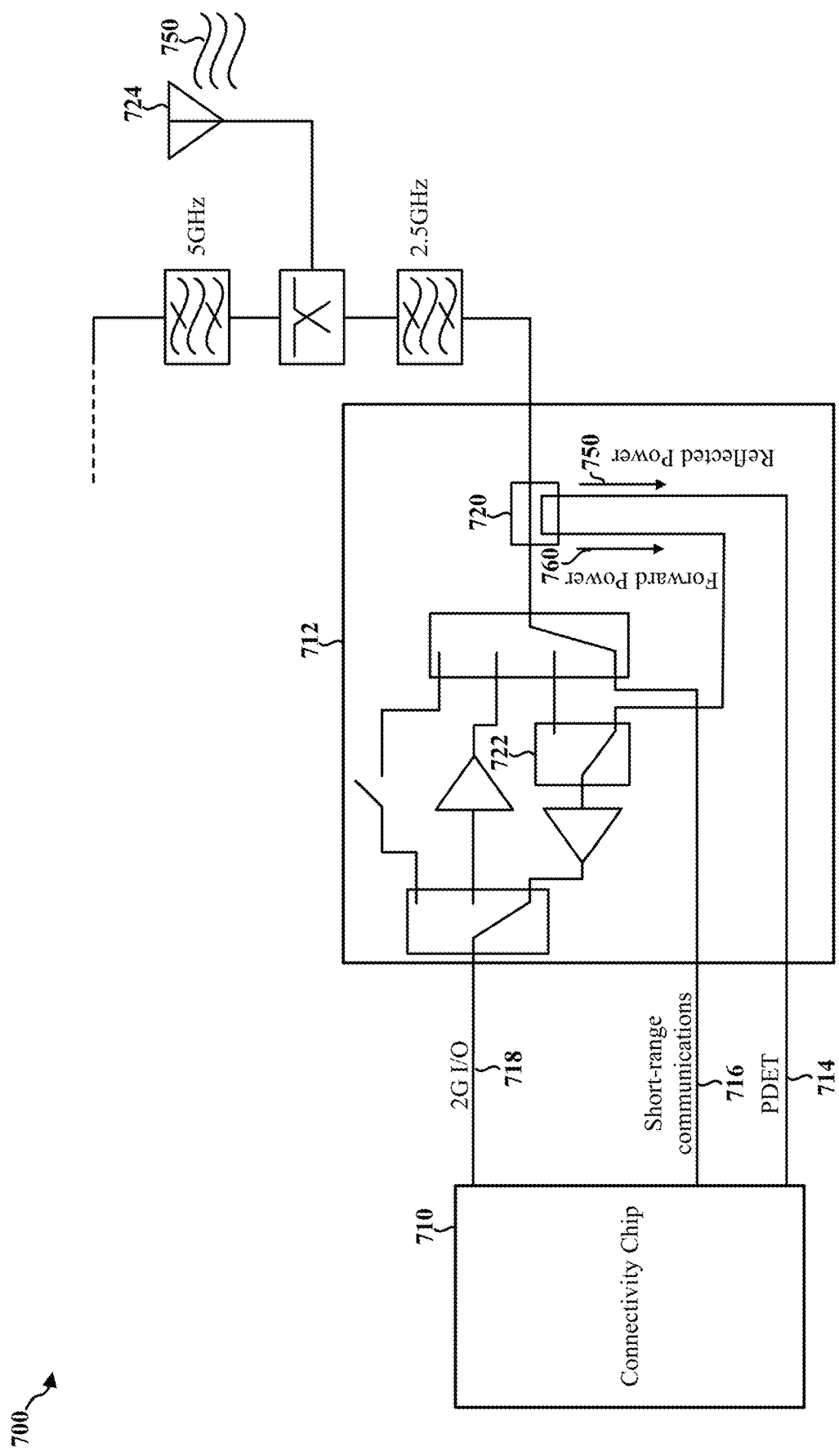
FIG. 7 is a diagram illustrating a wireless communications device, in accordance with certain aspects of the disclosure.

FIG. 7 is a block diagram of a source device 700. The source device 700 may be the source device 102 of FIG. 1A. The source device 700 may include a circuit 712. The circuit 712 may include and/or may be communicatively coupled to short-range communications circuitry 716, WLAN circuitry 718 (e.g., including a WLAN radio receiver), and a power detector 714 (e.g., a scalar power detector).

The source device 700 may further include a connectivity chip 710, which may control some functions of the short-range communications circuitry 716 and/or WLAN circuitry 718 through software and/or firmware. In some aspects, the connectivity chip 710 may include the circuit 712, and the illustrated connectivity chip 710 may include software and/or firmware.

The connectivity chip 710 may be configured to determine whether the first condition indicative of the reduction of RF power due to relatively close proximity to an absorptive object; that is, the connectivity chip 710 may determine the retransmission rate of one or more packets that are transmitted by the source device 700. When the retransmission rate satisfies a first threshold, the circuit 712 may determine the measurement associated with the gain of the antenna 724. For example, the connectivity chip 710 may activate the circuit 712 for detection of reflected RF power 750 and/or detection of forward power 760 when the retransmission rate satisfies the first threshold.

In some aspects, when the connectivity chip 710 determines that the retransmission rate satisfies the first threshold, the connectivity chip 710 may activate the circuit 712 for detection of the reflected RF power 750 measurement. The circuit 712 (e.g., the power detector 714 and/or the WLAN circuitry 718) may be configured to measure the total signal indicated by the reflected RF power 750. For example, the reflected RF power 750 may be fed into the power detector 714. The power detector 714 may measure the voltage and current indicated by the reflected RF power 750 (e.g., amplitude and phase variation of the signal corresponding to the reflected RF power 750).

For the measurement of the DEVM value and/or ACP value, the WLAN circuitry 718 may detect the forward power 760 of the signal, as well. An isolated port of the coupler 720 may be used to detect the forward power 760, as controlled by an RF switch 722. The RF switch 722 may cause either the path to/from the antenna 724 or the isolated port of the coupler 720 to be routed to the receiver input of the WLAN circuitry 718. The RF switch 722 may route the isolated port of the coupler 720 to the receiver input of the WLAN circuitry 718. Thus, when the forward power 760 of the signal is received at the coupler 720, the forward power 760 received at the coupler 720 may be fed back to the WLAN circuitry 718 (e.g., fed back to the WLAN radio receiver). The circuit 712 (e.g., the WLAN circuitry 718) may then measure the forward power 760.

The connectivity chip 710 may determine the DEVM value and/or the ACP value based on the reflected RF power 750 (e.g., measured through the power detector 714) and based on the forward power 760 (e.g., fed back into the WLAN circuitry 718 from the coupler 720). For example, the connectivity chip 710 may be configured for vector analysis of the reflected RF power 750 and the forward power 760. In aspects, the connectivity chip 710 may determine a DEVM value and/or an ACP value on one or more channels n that are offset from $F_c$ (and channel m) on which the initial signal is transmitted.

The connectivity chip 710 may quantize the DEVM value and/or the ACP value. For example, the connectivity chip 710 may determine which range of a set of ranges the DEVM value and/or the ACP value is within, and the connectivity chip 710 may assign, to the DEVM value and/or the ACP value, a quantized value corresponding to the range that the DEVM value and/or the ACP value is within. Further, the connectivity chip 710 may differentiate the quantized DEVM value and/or ACP if the transmit chain of the short-range communications circuitry 716 is within the ACP specifications (e.g., BT ACP specifications). For example, the quantized DEVM value and/or ACP value may be compared with one or more thresholds, such as a spectral mask. Referring to FIG. 1B, for example, the spectral mask 152 may define the one or more thresholds.

From the DEVM value and/or the ACP value, the connectivity chip 710 may determine that a current transmission power is lower than the maximum allowable transmission power. Further from the DEVM value and/or the ACP value, the connectivity chip 710 may detect one or more marginalities and/or failures of conformance with ACP parameter(s), such as on offset channels n illustrated in FIG. 1B. The connectivity chip 710 may detect that the one or more of the DEVM value and/or ACP value satisfy one or more second thresholds, such as a second threshold that may correspond to an ACP parameter marginality and/or failure.

The reduction of RF power due to relatively close proximity to an absorptive object may be indicated by the DEVM value and/or ACP value. Accordingly, when the connectivity chip 710 detects that the DEVM value and/or ACP value satisfy one or more second thresholds, the connectivity chip 710 may cause the short-range communications circuitry 716 to increase transmission power. For example, firmware of the connectivity chip 710 may force an increase of the transmission power of the short-range communications circuitry 716 (e.g., an increase to a level that might otherwise cause a spectral mask to be violated, were RF energy not lost to such an extent).

Figure 8:
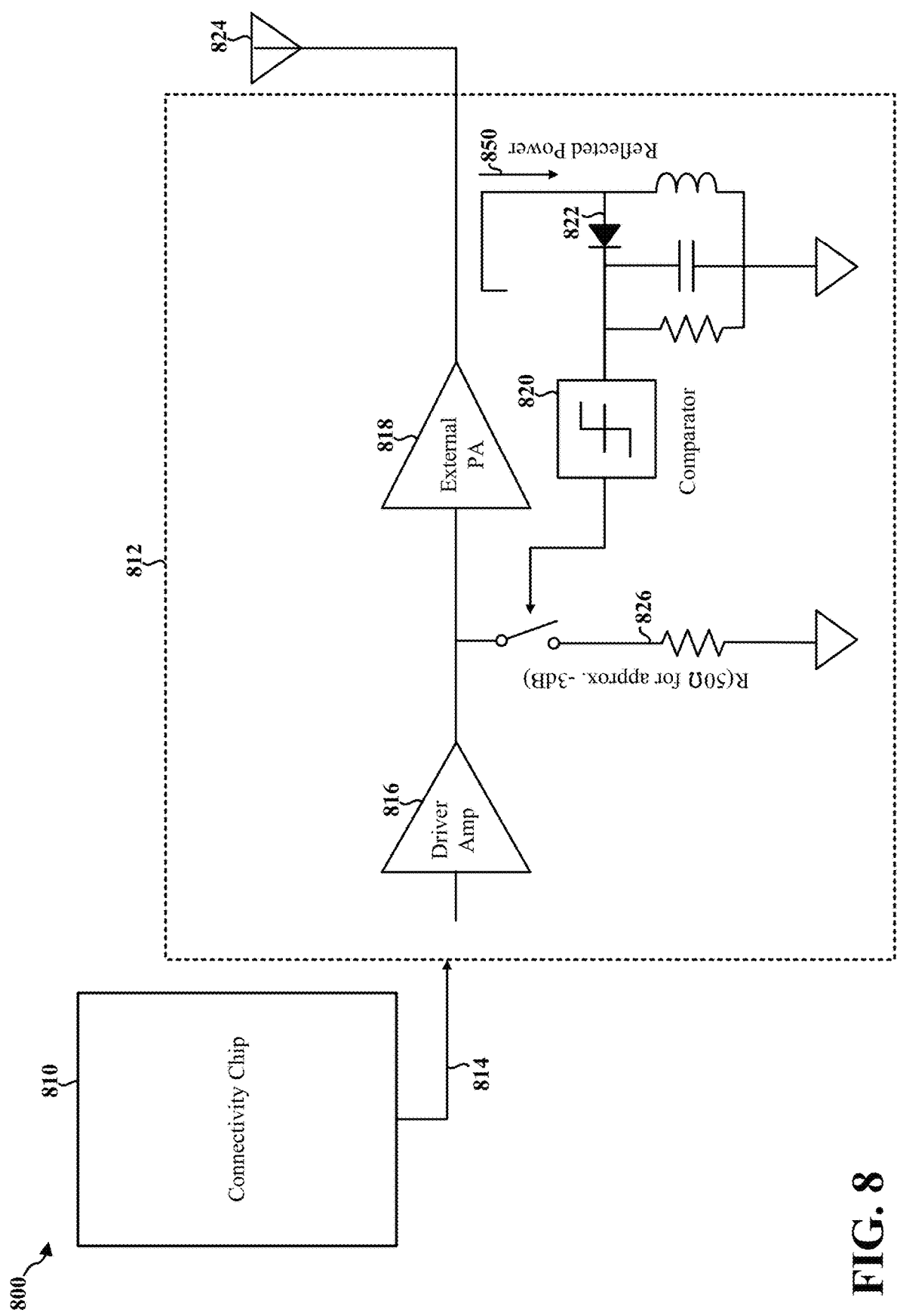
FIG. 8 is a diagram illustrating a wireless communications device, in accordance with certain aspects of the disclosure.

FIG. 8 is a block diagram of a source device 800. The source device 800 may be the source device 102 of FIG. 1A. The source device 800 may include a connectivity chip 810, which may control some functions of short-range communications circuitry through software and/or firmware. Additionally, the source device 800 may include a hardware circuit 812, which may be embedded in the RF frontend of the source device 800. The circuit 812 may include a self-governing feedback system for detection of VSWR change and corresponding increase of transmission power. However, the self-governing feedback system may first be enabled by the connectivity chip 810.

The connectivity chip 810 may be configured to determine the first condition indicative of the reduction of RF power due to relatively close proximity to an absorptive object; that is, the connectivity chip 810 may determine the retransmission rate of one or more packets that are transmitted by the source device 800. When the retransmission rate satisfies a first threshold, the circuit 812 may be used to determine the measurement associated with the gain of the antenna 824. For example, the connectivity chip 810 may activate the circuit 812 for detection of reflected RF power 850 when the retransmission rate satisfies the first threshold.

In some aspects, when the connectivity chip 810 determines that the retransmission rate satisfies the first threshold, the connectivity chip 810 may activate the circuit 812 for detection of the reflected RF power measurement through an enable pin 814. When the retransmission rate satisfies the first threshold, the connectivity chip 810 may activate the enable pin 814, such as by sending a control signal along the enable pin 814.

In one aspect, the enable pin 814 may include a frontend module (FEM) control line, which may exist in some devices although may be unused. In another aspect, the enable pin 814 may include a multi-function pin or general purpose input/output (GPIO) line (e.g., when the FEM control line is absent or used for another purpose). The use of the enable pin 814 (e.g., including and FEM control line or GPIO line) may allow implementation of the increased transmission power to overcome the reduction of RF power without a chip re-spin (thereby reducing development time for implementation of this technique).

The circuit 812 may control transmission power of the source device 800. For example, when the enable pin 814 activates the circuit 812, a signal to be applied to the antenna 824 is sent through the circuit 812, which includes a driver amplifier 816 and an external power amplifier 818. Additionally, the circuit 812 includes an attenuator 826. During normal operation, the antenna 824 is properly matched and, therefore, no significant reflected RF power is detected from the antenna 824. Therefore, the attenuator 826 may attenuate a signal. For example, the attenuator 826 may attenuate the signal so that the maximum possible transmission power is not reached through both the driver amplifier 816 and the external power amplifier 818.

However, when the antenna 824 is relatively proximate to an absorptive body, the antenna 824 may not be properly tuned, thereby causing the reflected RF power to increase. The reflected RF power 850 may be measured from a portion of a signal coming from the circuit 812 that is reflected at the antenna 824. The portion of the signal coming from the circuit 812 may be reflected at the antenna 824 due to antenna mismatch, which may be caused by the reduction of RF power and the reflected RF power 850 is fed into a power detector 822 (e.g., a scalar power detector). The output of the power detector 822 is provided to a comparator 820.

The comparator 820 may be configured to compare the reflected RF power 850 (as measured by the power detector 822) to a second threshold. When the comparator 820 determines that the reflected RF power 850 satisfies the second threshold, then the comparator 820 may switch out the attenuator 826. Without the attenuator 826, the RF power fed to the antenna 824 increases to maintain a better communications link (e.g., to maintain good BT A2DP audio quality). For example, the attenuator 826 may no longer attenuate a signal when the comparator 820 determines that the reflected RF power satisfies the second threshold. Accordingly, the maximum possible transmission power may be reached through both the driver amplifier 816 and the external power amplifier 818. Every time there is a gain change, the control voltage of the comparator 820 may be accordingly adjusted to what the comparator 820 input would see from the RF power detector 822 output.

Figure 9:
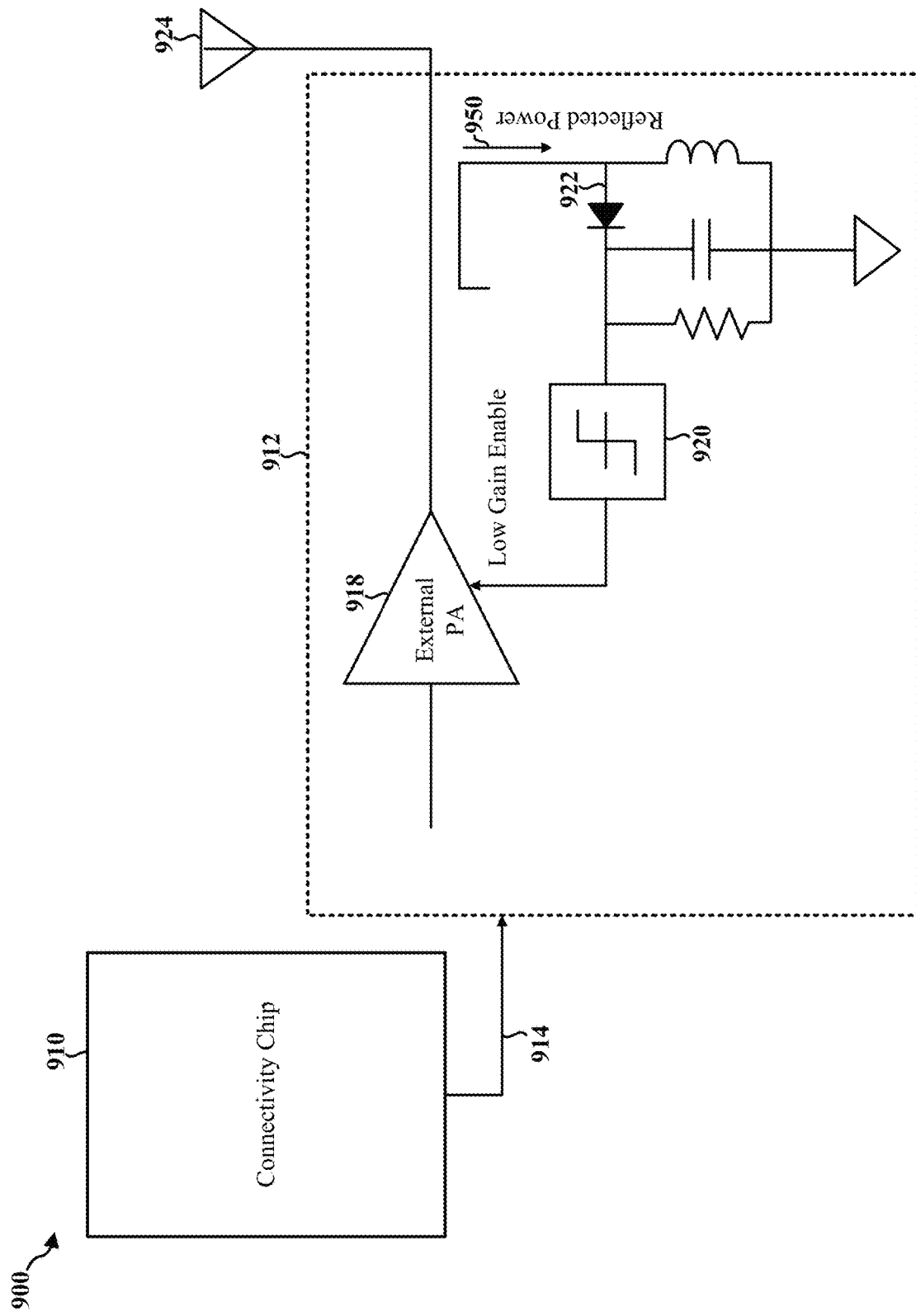
FIG. 9 is a diagram illustrating a wireless communications device, in accordance with certain aspects of the disclosure.

FIG. 9 is a block diagram of a source device 900. The source device 900 may be the source device 102 of FIG. 1A. The source device 900 may include a connectivity chip 910, which may control some functions of short-range communications circuitry through software and/or firmware. Additionally, the source device 900 may include a hardware circuit 912, which may be embedded in the RF frontend of the source device 900. The circuit 912 may include a self-governing feedback system for detection of VSWR change and corresponding increase of transmission power. However, the self-governing feedback system may first be enabled by the connectivity chip 910.

The connectivity chip 910 may be configured to determine whether the first condition indicative of the reduction of RF power; that is, the connectivity chip 910 may determine the retransmission rate of one or more packets that are transmitted by the source device 900. When the retransmission rate satisfies a first threshold, the circuit 912 may be used to determine the measurement associated with the gain of the antenna 924. For example, the connectivity chip 910 may activate the circuit 912 for detection of reflected RF power 950 when the retransmission rate satisfies the first threshold.

In some aspects, when the connectivity chip 910 determines that the retransmission rate satisfies the first threshold, the connectivity chip 910 may activate the circuit 912 for detection of the reflected RF power measurement through an enable pin 914. When the retransmission rate satisfies the first threshold, the connectivity chip 910 may activate the enable pin 914, such as by sending a control signal along the enable pin 914.

In one aspect, the enable pin 914 may include a FEM control line, which may exist in some devices although may be unused. In another aspect, the enable pin 914 may include a multi-function pin or GPIO line (e.g., when the FEM control line is absent or used for another purpose). The use of the enable pin 914 (e.g., including and FEM control line or GPIO line) may allow implementation of the increased transmission power to overcome the reduction of RF power without a chip re-spin (thereby reducing development time for implementation of this technique).

The circuit 912 may control transmission power of the source device 900. For example, when the enable pin 914 activates the circuit 912, a signal to be applied to the antenna 924 is sent through the circuit 912, which includes an external power amplifier 918. The external power amplifier 918 may have gain control enabled. When the reduction of RF power is relatively lower, the comparator 920 may receive a relatively low input voltage, such as a relatively low millivolts (mV) measurement. Accordingly, the comparator 920 may set the external power amplifier 918 to a low gain state.

When the antenna 924 is relatively proximate to an absorptive body, the antenna 924 may not be properly tuned, thereby causing the reflected RF power to increase. The reflected RF power 950 may be measured from a portion of a signal coming from the circuit 912 that is reflected at the antenna 924. The portion of the signal coming from the circuit 912 may be reflected at the antenna 924 due to antenna mismatch, which may be caused by the reduction of RF power due to relatively close proximity to an absorptive object. The reflected RF power 950 is fed into a power detector 922 (e.g., a scalar power detector). The output of the power detector 922 is provided to a comparator 920.

The comparator 920 may be configured to compare the reflected RF power 950 (as measured in mV by the power detector 922) to a second threshold (e.g., a predetermined comparator reference voltage). The comparator 920 may determine that the reflected RF power 950 satisfies the second threshold because the power detector 922 output voltage may increase above a predetermined comparator reference voltage. Correspondingly, the gain of the external power amplifier 918 may be adjusted to a higher state (e.g., by the comparator 920). As the gain of the external power amplifier 918 increases, the power detector 922 may detect a higher reflected RF power. To accommodate this sudden step in reflected RF power, the reference voltage of the comparator 920 may be adjusted accordingly.

Figure 10:
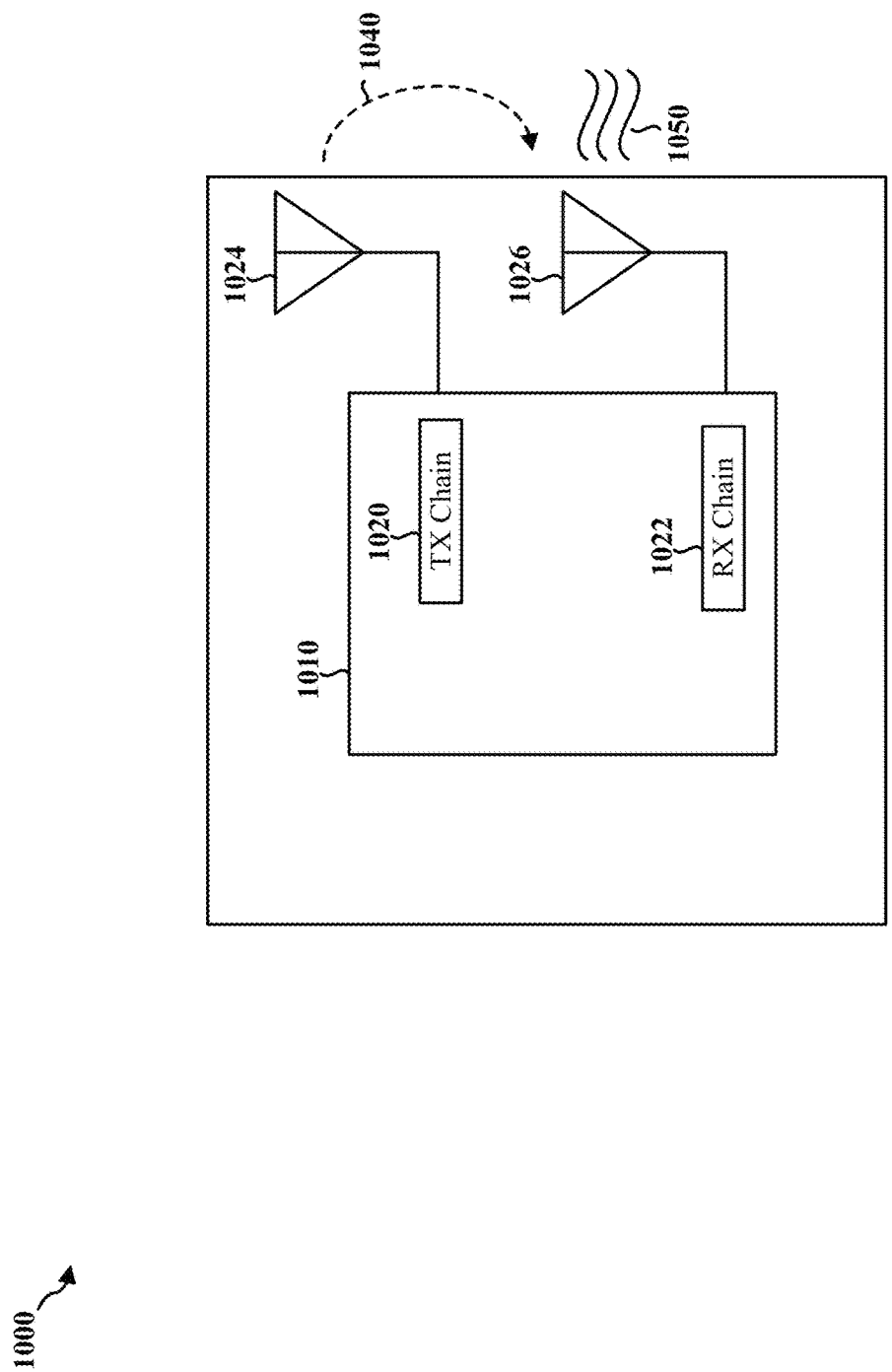
FIG. 10 is a diagram illustrating a wireless communications device, in accordance with certain aspects of the disclosure.

FIG. 10 is a block diagram of a source device 1000. The source device 1000 may be the source device 102 of FIG. 1A. The source device 1000 may include a connectivity chip 1010, which may control some functions of short-range communications circuitry through software and/or firmware. The connectivity chip 1010 may control short-range wireless communications transmissions through a transmit (TX) chain 1020 (e.g., TX Chain0) and, similarly, may control short-range wireless communications receptions through a receive (RX) chain 1022 (e.g., RX Chain2). TX chain 1020 may be communicatively coupled with a TX antenna 1024, and RX chain 1022 may be communicatively coupled with an RX antenna 1026. TX chain 1020 and RX chain 1022 may be different BT chains in a combination connectivity chip 1010. Furthermore, the RX antenna 1026 may be from diversity RX, diversity TX, multiple input multiple output (MIMO), and/or an antenna of another technology.

The RX antenna 1026 may be used for RF feedback. Some multipath and/or reflected signals may be perceived by RX chain 1022 as transmitted signals. For example, RX chain 1022 may interpret some multipath and/or reflected signals as transmitted signals if the antenna-to-antenna isolation 1040 (e.g., antenna-to-antenna mutual coupling) is relatively high, such as greater than 40 dB to 50 dB. A typical antenna-to-antenna isolation (or coupling) in a device may be on the order of 15 dB to 25 dB when operating in the same frequency band. Therefore, multipath signals may not corrupt the detection of reflected RF power.

The connectivity chip 1010 may be configured to determine whether the first condition indicative of the reduction of RF power due to relatively close proximity to an absorptive object; that is, the connectivity chip 1010 may determine the retransmission rate of one or more packets that are transmitted by the source device 1000. When the retransmission rate satisfies a first threshold, the connectivity chip 1010 may detect reflected RF power 1050 through RX chain 1022.

When a relatively large amount of RF energy is lost or absorbed, the RX antenna 1026 may detect the reflected RF power 1050 of a signal (e.g., to be transmitted via TX antenna 1024). The reflected RF power 1050 may be indicative of the gain of the TX antenna 1024 and, therefore, may be used to detect the second condition indicative of the reduction of RF power due to relatively close proximity to an absorptive object. The connectivity chip 1010 may measure the reflected RF power 1050 detected by RX chain 1022. The connectivity chip 1010 may determine whether the measurement of the reflected RF power 1050 satisfies a second threshold. When the measurement of the reflected RF power 1050 satisfies the second threshold, then the connectivity chip 1010 may cause the short-range communications circuitry 1016 to increase transmission power.

Figure 11:
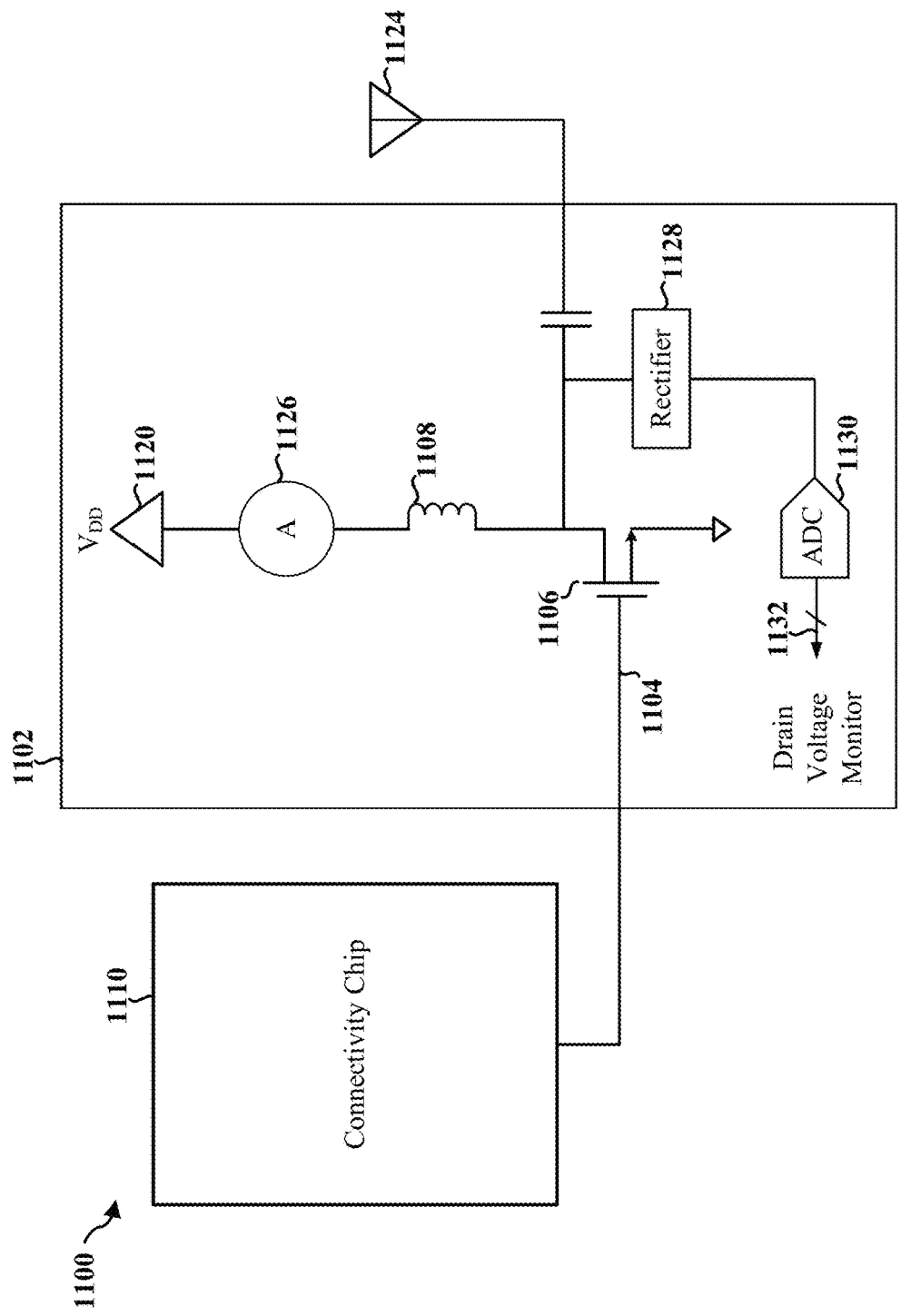
FIG. 11 is a diagram illustrating a circuit for a wireless communications device, in accordance with certain aspects of the disclosure.

FIG. 11 is a block diagram of a source device 1100. The source device 1100 may be the source device 102 of FIG. 1A. The source device 1100 may include a connectivity chip 1110, which may control some functions of short-range communications circuitry through software and/or firmware. Additionally, the source device 1100 may include a circuit 1102, which may be embedded in the RF frontend of the source device 1100. In some aspects, the circuit 1102 may be enabled by the connectivity chip 910.

The connectivity chip 1110 may be configured to determine the first condition indicative of the reduction of RF power due to relatively close proximity to an absorptive object; that is, the connectivity chip 1110 may determine the retransmission rate of one or more packets that are transmitted by the source device 1100. When the retransmission rate satisfies a first threshold, the circuit 1102 may be used to determine the measurement associated with the gain of the antenna 1124. For example, the connectivity chip 1110 may activate the circuit 1102 for measurement of a VSWR associated with the antenna 1124 when the retransmission rate satisfies the first threshold.

As illustrated, the circuit 1102 may include a last-stage power amplifier (PA) 1106, a rectifier 1128, an analog-to-digital converter (ADC) 1130, a PA bias inductor 1108, and a drain current monitor 1126. The circuit 1102 may be communicatively coupled with the antenna 1124, which may be at least one TX antenna of the source device 1100.

Variations in the RF load associated with the antenna 1124 may commensurately cause variations in the VSWR associated with the antenna 1124. For example, the "cross-the-body" issue or another similar issue causing occlusion of the antenna 1124 may cause variations to the RF load associated with the antenna 1124. As variations to the VSWR occur pursuant to the variations in the RF load associated with the antenna 1124, current drain and/or voltage drain may change. Accordingly, detection of current drain and/or voltage drain by the circuit 1102 may indicate variations to the VSWR and, correspondingly, to the RF load associated with the antenna 1124. The circuit 1102 may be used to monitor the drain voltage and current in an RFPA output circuit. For example, the circuit 1102 may comprise an amplifier, such as a class-AB amplifier in which the current may change with the load.

When the antenna 1124 is operating in free space (e.g., not occluded by a human body), the amplifier drain load-line may be set up for 50 Ohms load impedance operation. However, reduction of RF power due to relatively close proximity to an absorptive object (e.g., due to the "cross-the-body" issue) may cause the load impedance to change and, therefore, cause the VSWR to change. The closer an absorptive object (e.g., human body) is to the antenna 1124, the greater the change to the VSWR—correspondingly, the drain current and drain voltage may reflect greater changes the closer the absorptive body is to the antenna 1124.

An input signal 1104 is applied to the circuit 1102, such as when one or more packets are to be transmitted by the source device 1100. When the input signal 1104 is applied, the input signal 1104 may pass through a last-stage PA transistor 1106. Toward the drain supply 1120, a current may pass through a PA bias inductor 1108 to a drain current monitor 1126. The circuit 1102 may detect or measure the drain current at the drain current monitor 1126, such as when the signal 1104 is applied to the circuit 1102 for transmission via the antenna 1124.

Further, a current may be applied to the rectifier 1128 as the signal 1104 is applied. The rectifier 1128 may convert an alternating current from application of the signal 1104 to a direct current. The direct current associated with the signal 1104 from the rectifier 1128 may be converted to a digital signal by the ADC 1130. The digital signal from the ADC 1130 may pass to a drain voltage monitor 1132. The drain voltage monitor 1132 may detect or measure the drain voltage associated with the transmission of the signal 1104 via the antenna 1124.

The circuit 1102 may determine at least one of the drain current and/or the drain voltage from the drain current monitor 1126 and/or drain voltage monitor 1132, respectively. The circuit 1102 may compare the determined drain current and/or drain voltage to a respective one of a drain-current threshold or drain-voltage threshold. When the drain current satisfies (e.g., meets or exceeds) the drain-current threshold and/or the drain voltage satisfies the drain-voltage threshold, then the circuit 1102 may determine that VSWR has varied in connection with the RF load, thereby indicating the presence of an absorptive body causing reduction of RF power as the signal 1104 is transmitted via the antenna 1124. Accordingly, the transmission power of the source device 1100 may be increased, for example, by the connectivity chip 1110. For example, the circuit 1102 may provide an indication of the reduction of RF power to the connectivity chip 1110 when the drain current satisfies the drain-current threshold and/or the drain voltage satisfies the drain-voltage threshold.

When the connectivity chip 1110 determines that the retransmission rate satisfies the first threshold and, further, determines that the drain current satisfies the drain-current threshold and/or the drain voltage satisfies the drain-voltage threshold, then the connectivity chip 1110 may increase the transmission power for signals transmitted via the antenna 1124. The connectivity chip 1110 may increase the transmission power. The connectivity chip 1110 may increase the transmission power by a predetermined amount, such as an amount that is within a limit set by an ACP standard, a limit set by a regulatory body or standard for Specific Absorption Rate (SAR), or another limit or standard.

Figure 12:
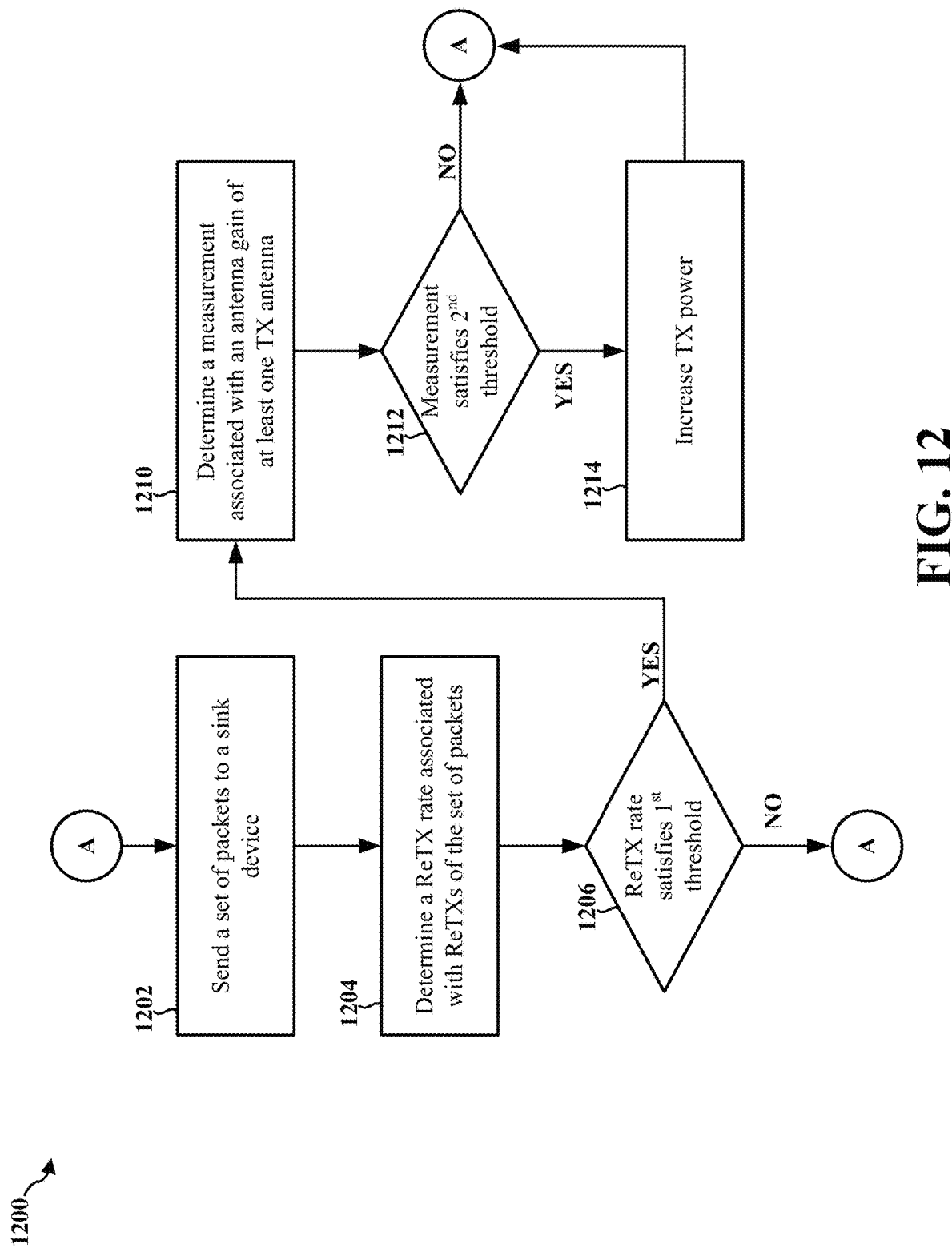
FIG. 12 is a flow chart illustrating a method of wireless communications, in accordance with certain aspects of the disclosure.

FIG. 12 is a flow diagram of a method 1200 of wireless communication, in accordance with various aspects. The method may be performed by a short-range wireless communications device, such as the source device 102. One or more of the illustrated operations may be transposed, omitted, and/or contemporaneously performed, according to different aspects.

At operation 1202, a first device may send a set of packets to a second device. For example, the first device may establish a short-range wireless communications connection with the second device. The first device may then send a set of packets to the second device over the established connection at a first transmission power. By way of example, the set of packets may include audio data for an audio stream and/or video data for a video stream. In the context of FIG. 1A, the source device 102 may send the first set of packets 124a to the sink device 112 over the communications link 116.

At operation 1204, the source device may determine a retransmission rate associated with retransmissions of the set of packets. The retransmission rate may be determined based on a number of the set of packets that is retransmitted by the first device or based on a number of received requests for retransmission of one or more of the set of packets. For example, the first device may receive a set of messages from the second device based on the set of packets. Each of the set of messages may indicate a request to retransmit a packet of the set of packets. The first device may count the number of the set of messages received in a predetermined time period.

In the context of FIG. 1A, the source device 102 may determine the retransmission rate 120. The source device 102 may determine the retransmission rate 120 based on transmitting the first set of packets 124a to the sink device 112. For example, the source device 102 may determine the retransmission rate 120 based on a number of the set of feedback messages 126 that are received within a predetermined time period. For example, referring to FIG. 6, the connectivity chip 610 may determine the retransmission rate. Referring to FIG. 7, the connectivity chip 610 may determine the retransmission rate. Referring to FIG. 8, the connectivity chip 810 may determine the retransmission rate. Referring to FIG. 9, the connectivity chip 910 may determine the retransmission rate. Referring to FIG. 10, the connectivity chip 1010 may determine the retransmission rate. Referring to FIG. 11, the connectivity chip 1110 may determine the retransmission rate.

At operation 1206, the first device may compare the determined retransmission rate to a first threshold. For example, the first device may compare the number of retransmitted packets of the set of packets or the number of the set of messages received from the second device to a first threshold. The first device may determine whether the count satisfies the first threshold, such as when the count meets or exceeds the first threshold. If the count satisfies the first threshold, then the first device may determine that a sufficient amount of packets are being lost such that the first device should determine whether to increase a transmission power of the first device. If the count does not satisfy the first threshold, the first device may continue to determine the retransmission rate. if the retransmission rate does not satisfy a first threshold, then the first device may continue sending a set of packets using the first transmission power (operation 1202). However, if the retransmission rate satisfies the first threshold, then the first device may determine a measurement associated with an antenna gain of at least one transmission antenna of the source device.

In the context of FIG. 1A, if the source device 102 determines that the retransmission rate 120 does not satisfy the first threshold, then the source device 102 may continue sending the first set of packets 124a to the sink device 112 using a current transmission power. However, if the source device 102 determines that the retransmission rate 120 satisfies the first threshold, then the source device 102 may determine that the first condition indicative of RF energy loss is present.

At operation 1210, the first device may determine a measurement associated with an antenna gain of at least one TX antenna. According to various aspects, the measurement may be one of a VSWR measurement or a dB measurement indicating reflected RF power. For example, the first device may measure at least one of VSWR and/or reflected RF power. The first device may correlate the measured at least one of VSWR and/or reflected RF power to an antenna gain measurement, such as by accessing a table that illustrates correspondence between a set of VSWR and/or reflected RF power measurements and a set of antenna gain measurements. The first device may then determine the antenna gain measurement that is correlated with the measured VSWR and/or reflected RF power based on the table.

In a first example, the first device may include a power detection circuit configured to detect the measurement associated with the antenna gain. The first device may determine the measurement associated with the antenna gain based on activation of the power detection circuit for the detection of the measurement. In a second example, the first device may include a receiver circuit configured to detect a reflected signal via the at least one antenna. The first device may determine the measurement based on the reflected signal. In a third example, the first device may include a comparator circuit configured to detect the measurement associated with the antenna gain, and the comparator circuit may be configured to deactivate an attenuator when the detected measurement satisfies a second threshold. The first device may be configured to detect the measurement associated with the antenna gain based on the activation of the comparator circuit. In a fourth example, the first device may include a comparator circuit that is configured to detect the measurement associated with the antenna gain, and the comparator circuit may be configured to increase a gain of an external power amplifier connected with the at least one antenna when the detected measurement satisfies the second threshold. The first device may be configured to detect the measurement associated with the antenna gain based on the activation of the comparator circuit. In a fifth example, the first device may include at least one other antenna associated with a receive chain that is different from a transmit chain associated with the at least one antenna. The first device may determine the measurement associated with the antenna gain based on a reflected signal detected via the at least one other antenna.

In the context of FIG. 1A, the source device 102 may determine the antenna gain measurement 122 associated with the antenna gain of the at least one antenna 104. In the context of FIG. 6, referring to the first example, the connectivity chip 610 may activate the circuit 612 for detection of reflected RF power 650, which may be detected by the power detector 614. In the context of FIG. 7, referring to the second example, the connectivity chip 710 may activate the circuit 712 for detection of reflected RF power 750, which may be detected by the short-range communications circuitry 716. In the context of FIG. 8, referring to the third example, the connectivity chip 810 may activate the circuit 812 for detection of reflected RF power 850, which may be controlled through the enable pin 814. In the context of FIG. 9, referring to the fourth example, the connectivity chip 910 may activate the circuit 912 for detection of reflected RF power 950, which may be controlled through the enable pin 914. In the context of FIG. 10, referring to the fifth example, the connectivity chip 1010 may measure the reflected RF power 1050 detected by RX chain 1022. In the context of FIG. 11, the circuit 1102 may detect or measure the drain current and/or the drain voltage, such as by obtaining the drain current from the drain current monitor 1126 and/or by obtaining the drain voltage from the drain voltage monitor 1132.

According to operation 1212, the first device may compare the measurement associated with the antenna gain to a second threshold. For example, the first device may compare the measurement associated with the antenna gain to the second threshold. The first device may determine whether the measurement associated with the antenna gain satisfies the second threshold, such as when the measurement associated with the antenna gain meets or exceeds the second threshold. If the measurement associated with the antenna gain satisfies the second threshold, then the first device may determine that RF power is being lost, such as due to proximity to an absorptive body. If the measurement associated with the antenna gain does not satisfy the second threshold, then the first device may continue sending a set of packets using the first transmission power (operation 1202). However, if the measurement associated with the antenna gain does satisfy the second threshold, then the first device may increase the transmission power of the source device (operation 1214).

At operation 1214, the first device may increase transmission power when sending a set of packets to the second device over the short-range wireless communications connection. That is, the first device may increase transmission power when the retransmission rate satisfies the first threshold and when the measurement associated with the antenna gain satisfies a second threshold. The first device may increase the transmission power by identifying an amount by which to increase the first transmission power, and the increased transmission power may exceed a threshold transmission power configured for the first device based on a limit or standard, such as a limit defined by an ACP standard and/or a limit defined for SAR. The first device may then send a set of packets with the increased transmission power.

With the increased transmission power, the first device may continue sending a set of packets to the second device. However, the first device may continue to determine the retransmission rate and the antenna gain measurement. If the retransmission rate and/or the antenna gain measurement fail to satisfy the first and second thresholds, respectively, after the transmission power is increased, then the first device may decrease the transmission power. The decreased transmission power may be decreased to be lower than a threshold transmission power, which may be associated with an ACP standard or an SAR standard.

In the context of FIG. 1A, the source device 102 may adjust the transmission power 128 by increasing the transmission power when sending the second set of packets 124b to the sink device 112 over the communications link 116. Referring to FIG. 6, in a first example, the connectivity chip 610 may increase the transmission power when the retransmission rate satisfies a first threshold and when the measurement associated with reflected RF power 650 exceeds a second threshold. Referring to FIG. 7, in a second example, the connectivity chip 710 may increase the transmission power when the retransmission rate satisfies a first threshold and when the measurement associated with reflected RF power 750 satisfies a second threshold. Referring to FIG. 8, in a third example, the connectivity chip 810 may increase the transmission power by causing the comparator 820 to switch out the attenuator 826. Referring to FIG. 9, in a fourth example, the connectivity chip 910 may increase the transmission power by comparator 920 may adjust the gain of the external power amplifier 918 to a higher state. Referring to FIG. 10, in a fifth example, the connectivity chip 1010 may increase the transmission power when the retransmission rate satisfies a first threshold and when the measurement associated with reflected RF power 1050 exceeds a second threshold. Referring to FIG. 11, the connectivity chip 1110 may increase the transmission power when the retransmission rate satisfies a first threshold and, further, when the drain current satisfies a drain-current threshold and/or the drain voltage satisfies a drain-voltage threshold.

Figure 13:
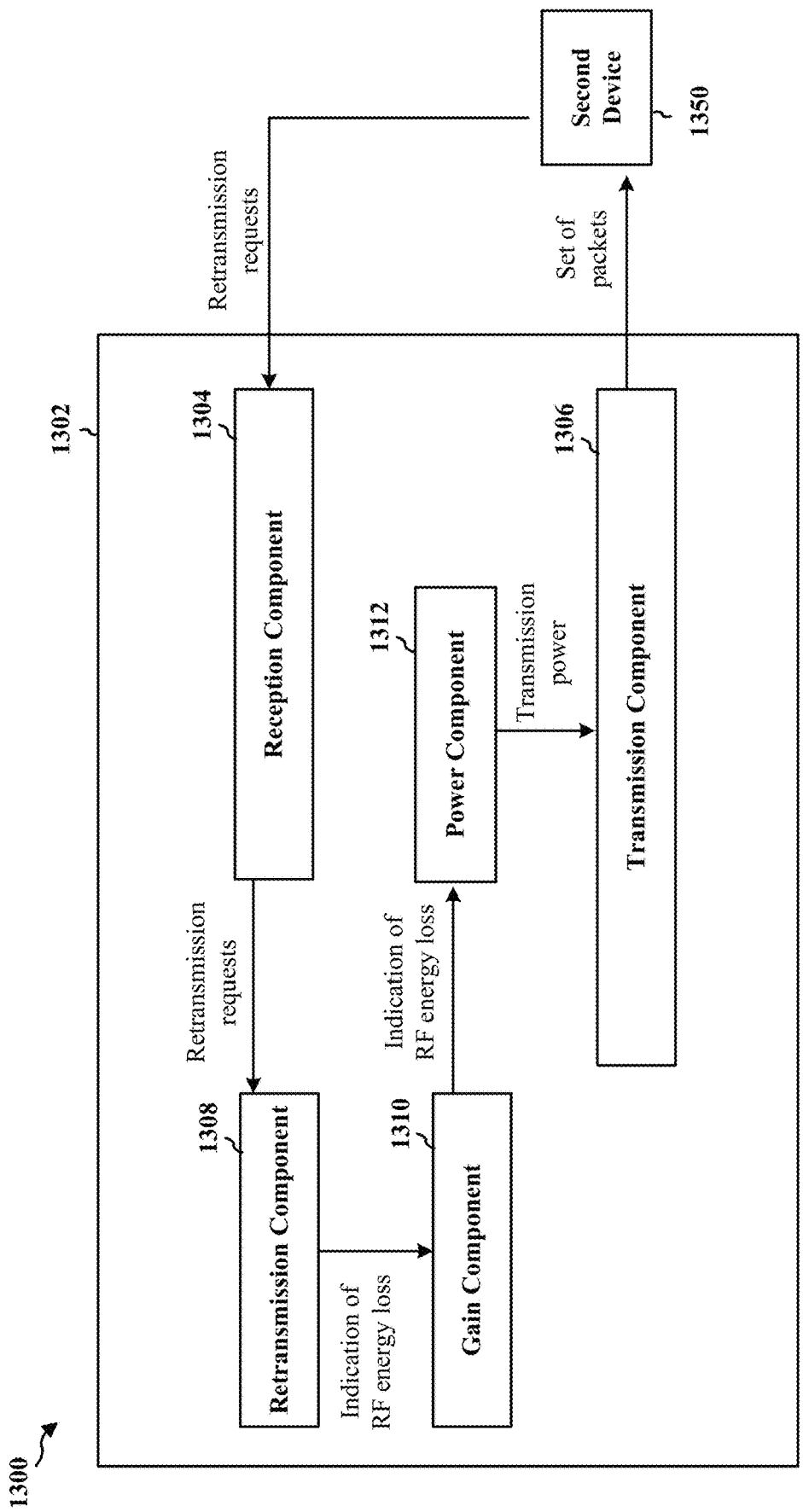
FIG. 13 is a conceptual data flow diagram illustrating the data flow between different means/components in an example apparatus.

FIG. 13 is a conceptual data flow diagram 1300 illustrating the data flow between different means/components in an example apparatus 1302. The apparatus 1302 may be a short-range wireless communications device. The apparatus 1302 may include a reception component 1304 configured to receive signals from a second device 1350. The apparatus 1302 may include a transmission component 1306 configured to transmit signals to the second device 1350.

The transmission component 1306 may transmit one or more packets to the second device 1350 over a short-range wireless communications link. The reception component 1304 may receive feedback based on the one or more packets from the second device 1350, and the feedback may include one or more retransmission requests. The reception component 1304 may provide the retransmission requests to a retransmission component 1308.

The retransmission component 1308 may be configured to determine a retransmission rate associated with retransmissions of one or more packets by the apparatus 1302. The retransmission component 1308 may determine the retransmission rate based on a number of one or more packets that are retransmitted by the transmission component 1306 over a predetermined time period and/or based on a number of the retransmission requests for one or more packets received from the second device 1350 over the predetermined time period.

The retransmission component 1308 may determine whether the retransmission rate satisfies a first threshold. If the retransmission rate satisfies the first threshold, then the retransmission component 1308 may indicate the reduction of RF power to a gain component 1310. If the retransmission rate does not satisfy the first threshold, then the retransmission component 1308 may refrain from indicating the reduction of RF power to the gain component 1310.

When the reduction of RF power is indicated to the gain component 1310, the gain component 1310 may determine a measurement associated with an antenna gain of at least one antenna of the apparatus 1302. The measurement associated with the antenna gain may be at least one of a VSWR measurement or a dB measurement indicating reflected RF power.

In one aspect, the gain component 1310 may be connected with a power detection circuit configured to detect the measurement associated with the antenna gain, and the gain component 1310 may determine the measurement based on activation of the power detection circuit for detection of the measurement associated with the antenna gain.

In another aspect, the gain component 1310 may be connected with a receiver circuit configured to detect a reflected signal via the at least one antenna. The gain component 1310 may be configured to determine the measurement associated with the antenna gain based on the reflected signal. For example, the gain component 1310 may determine a DEVM value and/or ACP value associated with the reflected signal. The gain component 1310 may quantize the DEVM value and/or ACP, and differentiate the quantized DEVM value and/or ACP value to determine the measurement associated with the antenna gain.

In another aspect, the gain component 1310 may be connected with a comparator circuit configured to detect the measurement associated with the antenna gain. The gain component 1310 may be configured to determine the measurement associated with the antenna gain based on activation of the comparator circuit. The comparator may be connected with at least one of an attenuator or an external power amplifier.

In another aspect, the gain component 1310 may be connected with at least one other antenna associated with a receive chain of the apparatus 1302, and the receive chain may be different from a transmit chain associated with the at least one antenna, which may be a TX antenna. The gain component 1310 may be configured to detect the measurement associated with the antenna gain based on a reflected signal detected via the at least one other antenna.

The gain component 1310 may compare the measurement associated with the antenna gain to a second threshold. If the measurement associated with the antenna gain satisfies the second threshold, then the gain component 1310 may indicate the reduction of RF power to a power component 1312. If the measurement associated with the antenna gain does not satisfy the second threshold, then the gain component 1310 may refrain from indicating the reduction of RF power to the power component 1312.

The power component 1312 may be configured to adjust a transmission power for transmitting one or more packets to the second device 1350 based on the indication of the loss of RF power. For example, the power component 1312 may increase the transmission power based on the indication of the loss of RF power indicated by the gain component 1310. In other words, the power component 1312 may increase the transmission power when the retransmission rate satisfies the first threshold and when the measurement associated with the antenna gain satisfies the second threshold. The power component 1312 may increase the transmission power to a level that exceeds a threshold transmission power configured for the apparatus 1302 based on a limit or standard associated with ACP or SAR.

The power component 1312 may further decrease the transmission power when the loss of RF power is no longer indicated. For example, when the retransmission component 1308 determines that the retransmission rate fails to satisfy the first threshold and/or when the gain component 1310 determines that the measurement associated with the antenna gain fails to satisfy the second threshold, then the power component 1312 may decrease the transmission power used for transmitting one or more packets to the second device 1350. In decreasing the transmission power, the power component 1312 may decrease the transmission power from the increased transmission power that exceeds the threshold transmission power. Thus, the power component 1312 may decrease the transmission power to a level that does not exceed the threshold transmission power that is based on the ACP standard or SAR standard.

In one aspect, when the gain component 1310 is connected with the power detection circuit, the power component 1312 may increase the transmission power based on a correspondence between the detected measurement associated with the antenna gain and the increased transmission power. For example, the power component 1312 may access a lookup table, which may be at least partially indexed by antenna gain measurements. The power component 1312 may identify an entry in the lookup table that matches the detected antenna gain measurement, such as by identifying an entry that includes a range of values. The power component 1312 may accordingly identify a power level indicated in the entry that corresponds to the detected antenna gain measurement. The power component 1312 may provide the identified power level to the transmission component 1306, which may transmit the one or more packets over the short-range wireless communications connection to the second device 1350.

In another aspect, when the gain component 1310 is connected with the receiver circuit, the power component 1312 may increase the transmission power based on at least one of DEVM and/or an ACP associated with the reflected signal detected by the receiver circuit. The gain component 1310 may indicate to the power component 1312 whether the DEVM and/or ACP associated with the reflected signal satisfies a threshold associated with the at least one antenna. The power component 1312 may indicate a power level to the transmission component 1306, and the power level may be preconfigured.

In another aspect, when the gain component 1310 includes a comparator circuit, the power component 1312 may be configured to increase the transmission power by deactivating the attenuator connected with the comparator and/or by increasing the gain of the external power amplifier.

The apparatus may include additional components that perform each of the blocks of the algorithm in the aforementioned flowcharts of FIG. 12. As such, each block in the aforementioned flowcharts of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
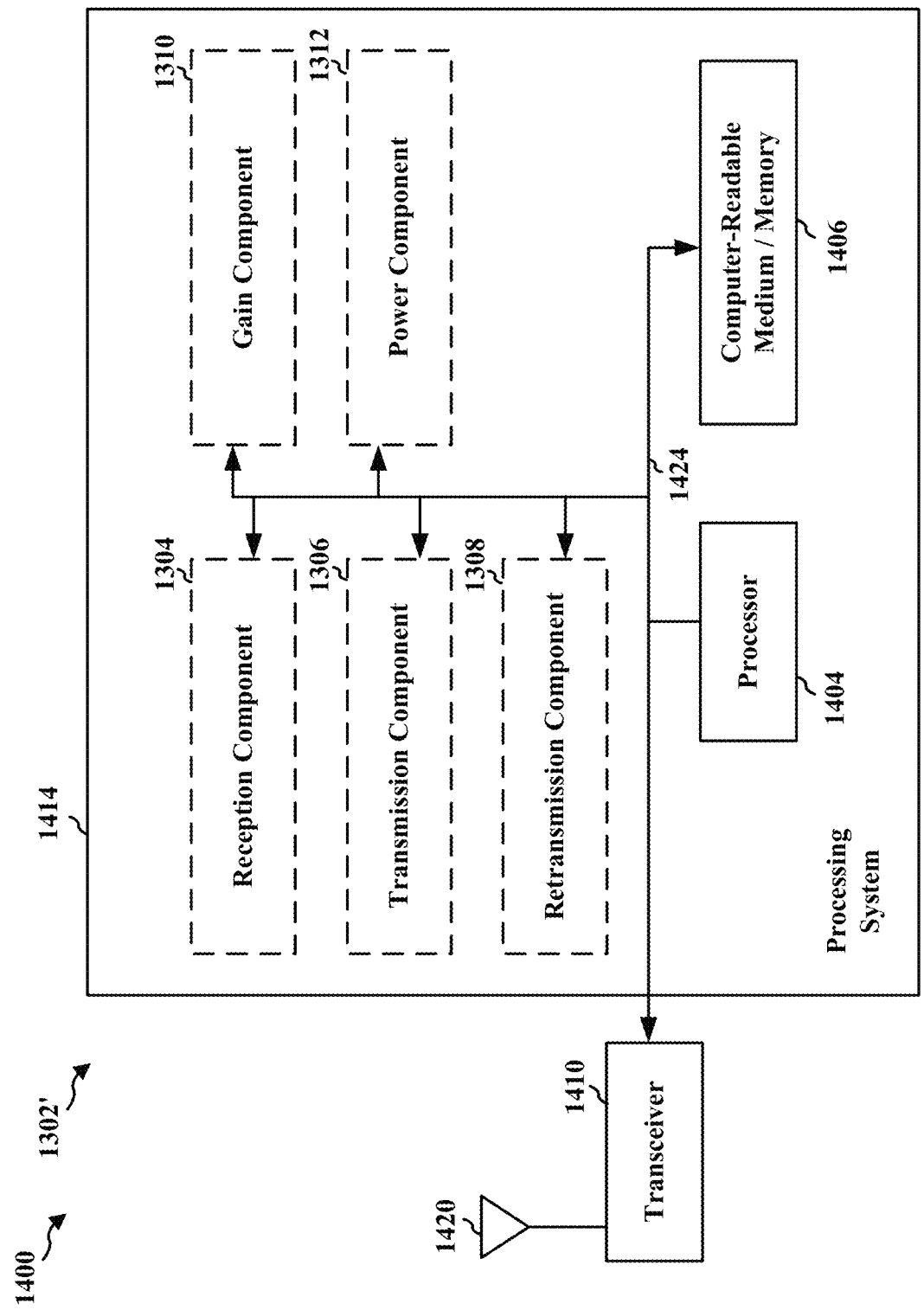
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, 1312 and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1306, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310, 1312. The components may be software components running in the processor 1404, resident/stored in the computer readable medium/memory 1406, one or more hardware components coupled to the processor 1404, or some combination thereof.

In one configuration, the apparatus 1302/1302' for wireless communication may include means for determining a retransmission rate associated with retransmissions of one or more packets by the communications device. The apparatus 1302/1302' may include means for determining a measurement associated with an antenna gain of at least one antenna of the communications device. The apparatus 1302/1302' may include means for adjusting a transmission power of the communications device based on the retransmission rate and based on the measurement. In one aspect, the measurement associated with the antenna gain comprises at least one of a VSWR measurement or a dB measurement indicating reflected RF power. In one aspect, the retransmission rate is determined based on a number of the one or more packets retransmitted by the communications device or based on a number of received requests for the retransmission of the one or more packets.

In one aspect, the means for adjusting the transmission power of the communications device is configured to increase the transmission power of the communications device when the retransmission rate satisfies a first threshold and when the measurement satisfies a second threshold, and the increased transmission power exceeds a threshold transmission power configured for the communications device based on an ACP standard or SAR standard.

In one aspect, the means for adjusting the transmission power of the communications device is configured to decrease the transmission power of the communications device when the retransmission rate fails to satisfy a first threshold and when the measurement fails to satisfy a second threshold, and the decreased transmission power is decreased from an increased transmission power that exceeds a threshold transmission power configured for the communications device based on an ACP standard or SAR standard, and the decreased transmission power is lower than the threshold transmission power.

The apparatus 1302/1302' may further include means for detecting the measurement, and the determining the measurement is based on the detection of the measurement, and the adjustment of the transmission power is based on a correspondence between the detected measurement and the adjusted transmission power.

The apparatus 1302/1302' may include means for detecting a reflected signal via the at least one antenna, and the determination of the measurement is based on the reflected signal, and the adjustment of the transmission power is based on at least one of a DEVM or an ACP associated with the reflected signal.

The apparatus 1302/1302' may include means for detecting the measurement, and means for deactivating an attenuator when the detected measurement satisfies a second threshold, and, when the retransmission rate satisfies a first threshold, the determination of the measurement and the adjustment of the transmission power is based on the detection of the measurement and the deactivation of the attenuator. In another aspect, the apparatus 1302/1302' may include means for increasing a gain of an external power amplifier connected with the at least one antenna when the detected measurement satisfies a second threshold, and, when the retransmission rate satisfies a first threshold, the determination of the measurement and the adjustment of the transmission power is based on the increase of the gain of the external power amplifier.

In one aspect, the measurement is based on a reflected signal detected via at least one other antenna associated with a receive chain that is different from a transmit chain associated with the at least one antenna.

The aforementioned means may be one or more of the aforementioned processor(s) 202, short-range communications controller 252, antennas 235*a-d*, and/or radio 230 in FIG. 2. Alternatively or additionally, the aforementioned means may be one or more of the components 1304, 1306, 1308, 1310, 1312 of the apparatus 1302 and/or the processing system 1414 of the apparatus 1302' of FIGS. 13-14, which may be configured to perform the functions and operations recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A communications device configured for wireless communications, the communications device comprising:
   a memory; and
   at least one processor coupled to the memory and configured to:
   determine a retransmission rate associated with retransmissions of one or more packets by the communications device, wherein the retransmission rate is determined based on a number of the one or more packets retransmitted by the communications device or based on a number of received requests for the retransmissions of the one or more packets within a configured time period;
   determine a measurement associated with an antenna gain of at least one antenna of the communications device; and
   adjust a transmission power of the communications device based on the retransmission rate and based on the measurement, wherein the transmission power is adjusted by increasing the transmission power of the communications device when the retransmission rate satisfies a first threshold and when the measurement satisfies a second threshold or by decreasing the transmission power of the communications device when the retransmission rate fails to satisfy a first threshold or when the measurement fails to satisfy a second threshold.

2. The communications device of claim 1, wherein the measurement associated with the antenna gain comprises at least one of a voltage standing wave ratio (VSWR) measurement or a decibel (dB) measurement indicating reflected radio frequency (RF) power.

3. The communications device of claim 1,
   wherein the increased transmission power exceeds a threshold transmission power configured for the communications device based on an adjacent channel power (ACP) standard.

4. The communications device of claim 1,
   wherein the decreased transmission power is decreased from an increased transmission power that exceeds a threshold transmission power configured for the communications device based on an adjacent channel power (ACP) standard, and the decreased transmission power is lower than the threshold transmission power.

5. The communications device of claim 1, further comprising:
   a power detection circuit configured to detect the measurement, wherein
   the at least one processor is configured to determine the measurement based on activation of the power detection circuit for the detection of the measurement, and is configured to adjust the transmission power based on a correspondence between the detected measurement and the adjusted transmission power.

6. The communications device of claim 1, further comprising:
   a receiver circuit configured to detect a reflected signal via the at least one antenna, wherein
   the at least one processor is configured to determine the measurement based on the reflected signal, and is configured to adjust the transmission power based on at least one of a differential error vector magnitude (DEVM) or an adjacent channel power (ACP) associated with the reflected signal.

7. The communications device of claim 1, further comprising:
   a comparator circuit configured to detect the measurement, and to deactivate an attenuator when the detected measurement satisfies a second threshold,
   wherein, when the retransmission rate satisfies a first threshold, the at least one processor is configured to determine the measurement and to adjust the transmission power based on activation of the comparator circuit for the detection of the measurement and the deactivation of the attenuator.

8. The communications device of claim 1, further comprising:
a comparator circuit configured to detect the measurement, and to increase a gain of an external power amplifier connected with the at least one antenna when the detected measurement satisfies a second threshold,
wherein, when the retransmission rate satisfies a first threshold, the at least one processor is configured to determine the measurement and to adjust the transmission power based on activation of the comparator circuit for the detection of the measurement and the increase of the gain of the external power amplifier.

9. The communications device of claim 1, further comprising:
at least one other antenna associated with a receive chain that is different from a transmit chain associated with the at least one antenna,
wherein the at least one processor is configured to determine the measurement based on a reflected signal detected via the at least one other antenna.

10. A method of a communications device configured for wireless communications, the method comprising:
determining, a retransmission rate associated with retransmissions of one or more packets by the communications device, wherein the retransmission rate is determined based on a number of the one or more packets retransmitted by the communications device or based on a number of received requests for the retransmissions of the one or more packets within a configured time period;
determining a measurement associated with an antenna gain of at least one antenna of the communications device; and
adjusting a transmission power of the communications device based on the retransmission rate and based on the measurement, wherein the transmission power is adjusted by increasing the transmission power of the communications device when the retransmission rate satisfies a first threshold and when the measurement satisfies a second threshold or by decreasing the transmission power of the communications device when the retransmission rate fails to satisfy a first threshold or when the measurement fails to satisfy a second threshold.

11. The method of claim 10, wherein the measurement associated with the antenna gain comprises at least one of a voltage standing wave ratio (VSWR) measurement or a decibel (dB) measurement indicating reflected radio frequency (RF) power.

12. The method of claim 10,
wherein the increased transmission power exceeds a threshold transmission power configured for the communications device based on an adjacent channel power (ACP) standard.

13. The method of claim 10,
wherein the decreased transmission power is decreased from an increased transmission power that exceeds a threshold transmission power configured for the communications device based on an adjacent channel power (ACP) standard, and the decreased transmission power is lower than the threshold transmission power.

14. The method of claim 10, further comprising:
detecting, by a power detection circuit, the measurement, wherein
the determining the measurement is based on activating the power detection circuit for the detecting of the measurement, and the adjusting the transmission power is based on a correspondence between the detected measurement and the adjusted transmission power.

15. The method of claim 10, further comprising:
detecting, by a receiver circuit, a reflected signal via the at least one antenna, wherein
the determining the measurement is based on the reflected signal, and the adjusting the transmission power is based on at least one of a differential error vector magnitude (DEVM) or an adjacent channel power (ACP) associated with the reflected signal.

16. The method of claim 10, further comprising:
detecting, by a comparator circuit, the measurement; and
deactivating, by the comparator circuit, an attenuator when the detected measurement satisfies a second threshold,
wherein, when the retransmission rate satisfies a first threshold, the determining the measurement and the adjusting the transmission power is based on activating the comparator circuit for the detecting the measurement and the deactivating the attenuator.

17. The method of claim 10, further comprising:
detecting, by a comparator circuit, the measurement; and
increasing, by the comparator circuit, a gain of an external power amplifier connected with the at least one antenna when the detected measurement satisfies a second threshold,
wherein, when the retransmission rate satisfies a first threshold, the determining the measurement and the adjusting the transmission power is based on activating the comparator circuit for the detecting of the measurement and the increasing of the gain of the external power amplifier.

18. The method of claim 10, further comprising:
wherein the measurement is based on a reflected signal detected via at least one other antenna associated with a receive chain that is different from a transmit chain associated with the at least one antenna.

19. An apparatus configured for wireless communications, comprising:
means for determining a retransmission rate associated with retransmissions of one or more packets by the apparatus, wherein the retransmission rate is determined based on a number of the one or more packets retransmitted by the communications device or based on a number of received requests for the retransmissions of the one or more packets within a configured time period;
means for determining a measurement associated with an antenna gain of at least one antenna of the apparatus; and
means for adjusting a transmission power of the communications device based on the retransmission rate and based on the measurement, wherein the means for adjusting the transmission power of the apparatus is configured to increase the transmission power of the apparatus when the retransmission rate satisfies a first threshold and when the measurement satisfies a second threshold, or decrease the transmission power of the apparatus when the retransmission rate fails to satisfy a first threshold or when the measurement fails to satisfy a second threshold.

20. The apparatus of claim 19, wherein the measurement associated with the antenna gain comprises at least one of a voltage standing wave ratio (VSWR) measurement or a decibel (dB) measurement indicating reflected radio frequency (RF) power.

21. The apparatus of claim 19,
wherein the increased transmission power exceeds a threshold transmission power configured for the apparatus based on an adjacent channel power (ACP) standard.

22. The apparatus of claim 19,
wherein the decreased transmission power is decreased from an increased transmission power that exceeds a threshold transmission power configured for the apparatus based on an adjacent channel power (ACP) standard, and the decreased transmission power is lower than the threshold transmission power.

23. The apparatus of claim 19, further comprising:
means for detecting the measurement, wherein
the determination of the measurement is based on the detection of the measurement, and the adjustment of the transmission power is based on a correspondence between the detected measurement and the adjusted transmission power.

24. The apparatus of claim 19, further comprising:
means for detecting a reflected signal via the at least one antenna, wherein
the determination of the measurement is based on the reflected signal, and the adjustment of the transmission power is based on at least one of a differential error vector magnitude (DEVM) or an adjacent channel power (ACP) associated with the reflected signal.

25. The apparatus of claim 19, further comprising:
means for detecting the measurement; and
means for deactivating an attenuator when the detected measurement satisfies a second threshold,
wherein, when the retransmission rate satisfies a first threshold, the determination of the measurement and the adjustment of the transmission power is based on the detection of the measurement and the deactivation of the attenuator.

26. The apparatus of claim 19, further comprising:
means for detecting the measurement; and
means for increasing a gain of an external power amplifier connected with the at least one antenna when the detected measurement satisfies a second threshold,
wherein, when the retransmission rate satisfies a first threshold, the determination of the measurement and the adjustment of the transmission power is based on the detection of the measurement and the increase of the gain of the external power amplifier.

27. A non-transitory, computer-readable medium storing computer-executable code for wireless communication by a communications device, comprising code to:
determine a retransmission rate associated with retransmissions of one or more packets by the communications device, wherein the retransmission rate is determined based on a number of the one or more packets retransmitted by the communications device or based on a number of received requests for the retransmissions of the one or more packets within a configured time period;
determine a measurement associated with an antenna gain of at least one antenna of the communications device; and
adjust a transmission power of the communications device based on the retransmission rate and based on the measurement, wherein the transmission power is adjusted by increasing the transmission power of the communications device when the retransmission rate satisfies a first threshold and when the measurement satisfies a second threshold or by decreasing the transmission power of the communications device when the retransmission rate fails to satisfy a first threshold or when the measurement fails to satisfy a second threshold.

* * * * *